United States Patent
Di Trapani et al.

(10) Patent No.: US 9,939,563 B2
(45) Date of Patent: Apr. 10, 2018

(54) SKY-DOME LIGHTING SYSTEM

(71) Applicant: CoeLux S.r.l., Lomazzo (IT)

(72) Inventors: Paolo Di Trapani, Cavallasca (IT); Davide Magatti, Capiago Intimiano (IT); Antonio Lotti, Arcisate Varese (IT)

(73) Assignee: CoeLux S.r.l., Como (IT)

( * ) Notice: Subject to any disclaimer, the term of this patent is extended or adjusted under 35 U.S.C. 154(b) by 0 days.

(21) Appl. No.: 15/211,777

(22) Filed: Jul. 15, 2016

(65) Prior Publication Data

US 2017/0016594 A1    Jan. 19, 2017

(30) Foreign Application Priority Data

Jul. 15, 2015    (WO) .................. PCT/EP2015/001454
Jul. 15, 2015    (WO) .................. PCT/EP2015/001455
Nov. 19, 2015    (WO) .................. PCT/EP2015/002318

(51) Int. Cl.

| | |
|---|---|
| *F21V 9/00* | (2015.01) |
| *G02B 5/02* | (2006.01) |
| *C03C 19/00* | (2006.01) |
| *B32B 17/10* | (2006.01) |
| *F21V 7/00* | (2006.01) |

(52) U.S. Cl.
CPC ........ *G02B 5/0284* (2013.01); *B32B 17/1022* (2013.01); *C03C 19/00* (2013.01); *G02B 5/0231* (2013.01); *G02B 5/0242* (2013.01); *G02B 5/0294* (2013.01); *F21V 7/0008* (2013.01)

(58) Field of Classification Search
CPC ............... F21S 48/1154; F21S 48/1159; F21S 48/1329; F21S 48/1364; F21S 48/1388; F21V 7/0008; F21V 7/09; F21V 13/14; F21V 14/02; F21V 5/002; F21V 7/0091; F21Y 2115/10
USPC ........................................... 362/293
See application file for complete search history.

(56) References Cited

U.S. PATENT DOCUMENTS

| | | | | |
|---|---|---|---|---|
| 5,923,466 A | * | 7/1999 | Krause ............... | G01M 11/0264 359/385 |
| 6,097,449 A | * | 8/2000 | Yamamoto ........... | H04N 9/3105 348/E9.027 |
| 7,736,021 B2 | * | 6/2010 | Solomon ............... | F21S 10/007 362/257 |

(Continued)

FOREIGN PATENT DOCUMENTS

| | | |
|---|---|---|
| JP | 4-121776 A | 4/1992 |
| JP | 4-121778 A | 4/1992 |

(Continued)

OTHER PUBLICATIONS

Standard Terminology of Appearance, ASTM International, Designation: E284-09a, downloaded Feb. 2012, pp. 1-23 (23 total pages).

(Continued)

*Primary Examiner* — Thien M Le
(74) *Attorney, Agent, or Firm* — DiBerardino McGovern IP Group LLC

(57) ABSTRACT

A lighting system comprises a chromatic reflective unit (606), and a light source (602), wherein the chromatic reflective unit (606) is shaped as a rotational paraboloid or a portion of a rotational paraboloid, and the light source (602) is positioned close to or at the paraboloid focal position.

24 Claims, 9 Drawing Sheets

(56) References Cited

U.S. PATENT DOCUMENTS

| | | | | |
|---|---|---|---|---|
| 2002/0014575 | A1* | 2/2002 | Hatano | G11B 7/1362 250/201.5 |
| 2004/0251469 | A1* | 12/2004 | Yatsuda | F21K 9/00 257/100 |
| 2010/0085639 | A1* | 4/2010 | Tsai | G02B 27/283 359/485.06 |
| 2011/0085343 | A1* | 4/2011 | Ohno | F21S 48/1159 362/510 |
| 2011/0273897 | A1* | 11/2011 | Kojima | F21S 48/1127 362/510 |
| 2012/0176809 | A1* | 7/2012 | Ohno | F21S 48/1159 362/510 |

FOREIGN PATENT DOCUMENTS

| | | |
|---|---|---|
| WO | 2009156347 A1 | 12/2009 |
| WO | 2009156348 A1 | 12/2009 |
| WO | 2014076656 A1 | 5/2014 |
| WO | 2015172794 A1 | 11/2015 |
| WO | 2015172821 A1 | 11/2015 |

OTHER PUBLICATIONS

Thomas C. Grenfell et al., "Representation of a nonsphericai ice particle by a collection of independent spheres for scattering and absorption of radiation," Journal of Geophysical Research, vol. 104, No. D24, Dec. 27, 1999, pp. 31,697-31,709 (13 total pages).

"Perception and Objective Measurement of Reflection Haze" for hazemeters and glossmeters introduction, Friedhelm Fensterseifer, BYK-Gardner, BYK-Gardner Catalog 2010/2011, pp. 27-28 (2 total pages).

European Search Report based on counterpart European Application No. EP16179822.8, issued by the European Patent Office dated Jan. 9, 2017 (7 total pages).

* cited by examiner

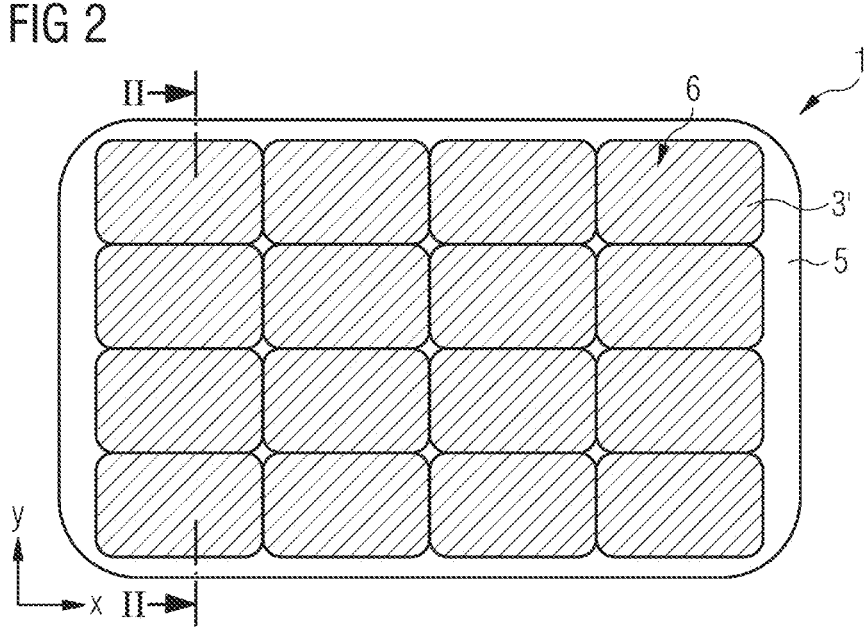
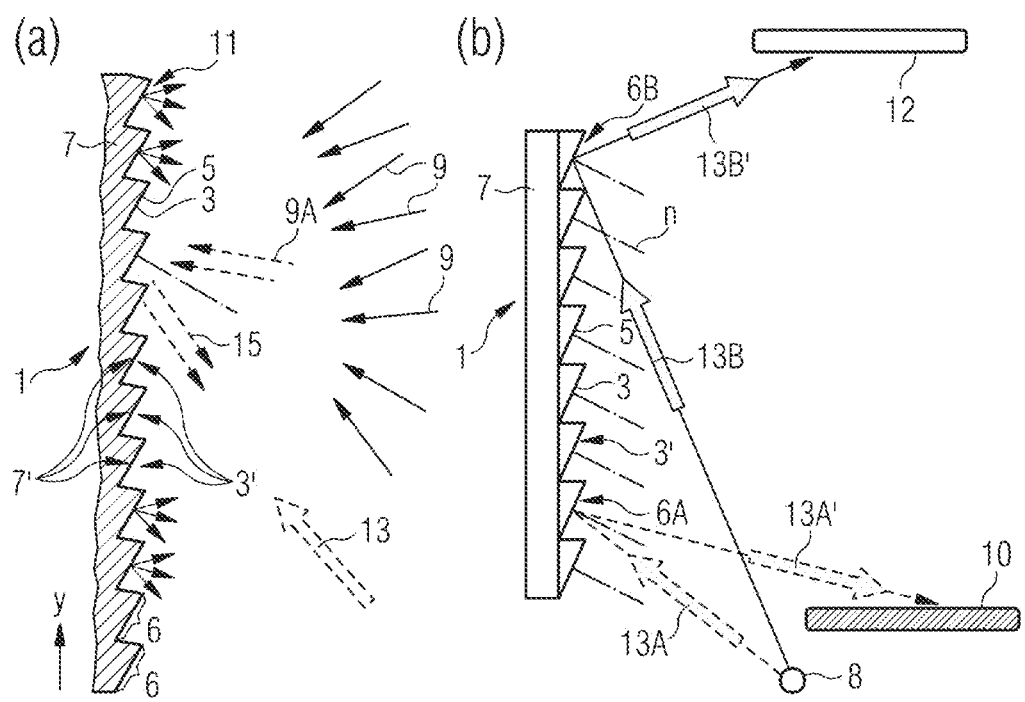

FIG 16
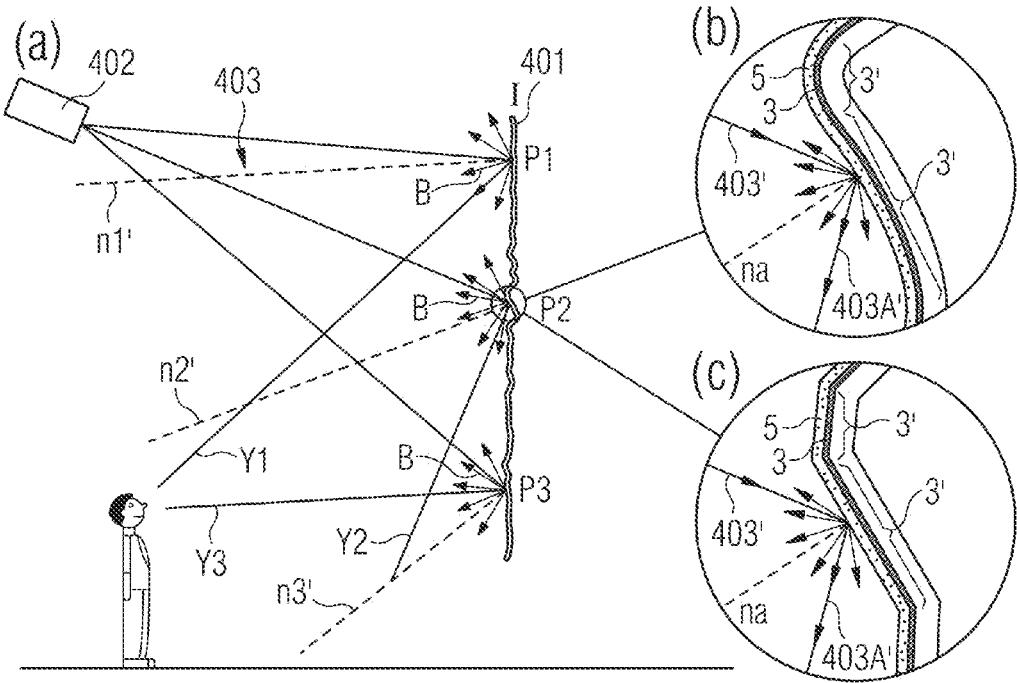
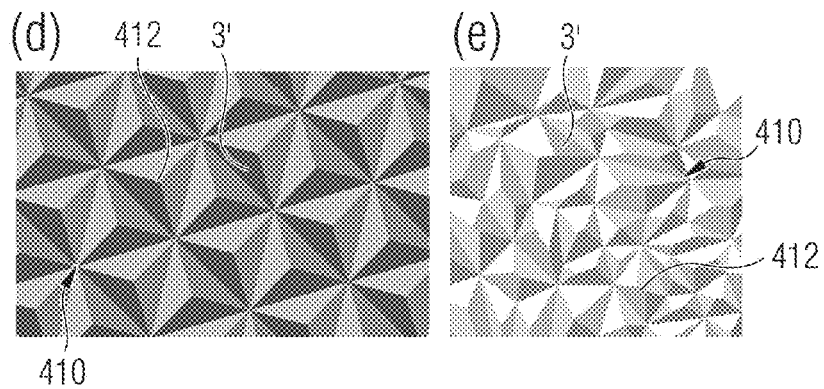
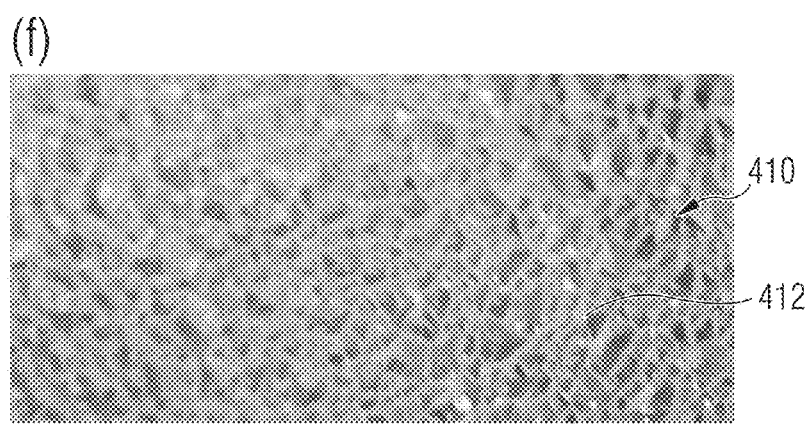

US 9,939,563 B2

SKY-DOME LIGHTING SYSTEM

CROSS REFERENCE TO RELATED APPLICATIONS

The present application claims priority to PCT/EP2015/002318 filed 19 Nov. 2015, and PCT/EP2015/001454 filed 15 Jul. 2015 of the same applicants. The contents of both of these applications are incorporated herein by reference in their entireties.

TECHNICAL FIELD

The present disclosure relates generally to chromatic mirror units and in particular to nanoparticle based light affecting units that may be applied in lighting systems or in facade structures of buildings to provide for a desired optical and visual effect.

BACKGROUND

The improvements in mirror manufacturing techniques during the 16th century caused an increasing use of optical mirror elements in interior architecture. For example, the overlay of a portion of a wall with a reflective surface generated the impression of space enhancement and an increase of depth perception. Since then, mirrors became essential components capable of improving the comfort of an ambience through a widening in the perceived volume. In general, in modern and contemporary architecture, reflective surfaces are used to provide for specific perceptions by an observer.

SUMMARY OF THE DISCLOSURE

The following disclosure is at least partly based on specific nanoparticle based reflective units, and their application in the fields of active and passive illumination such as in lighting in general or outdoor facade applications.

As will be disclosed herein, the specific nanoparticle based reflective units may be used to provide for a specific visual perception of an outdoor or indoor wall for the observer. Those units may provide specific chromatic and reflective features that provide for properties of sun imitating lighting systems such as described, for example, in the international patent application WO 2015/172821 A1 by the same applicants, in which reflective and diffusing layers are combined.

On Rayleigh-like diffusing layers, several applications such as EP 230 478 A1, EP 2 304 480 A1, and WO 2014/076656 A1, filed by the same applicants, disclose lighting systems that use a light source producing visible light, and a panel containing nanoparticles used in transmission, i.e. the light source and the illuminated area are positioned on opposing sides of the panel. During operation of those lighting systems, the panel receives the light from the light source and acts in transmission as a so-called Rayleigh diffuser, namely it diffuses incident light similarly to the earth atmosphere in clear-sky conditions. Specifically, the concepts refer to directional light with lower correlated color temperature (CCT), which corresponds to sunlight, and diffuse light with larger CCT, which corresponds to the light of the blue sky.

Introducing a reflective feature as, for example, in WO 2015/172821 A1 mentioned above, however, may affect the perception due to the presence of the reflection. In particular, for lighting systems that intend to trick the eye by providing a natural imitating sky sun illumination, for example together with a visual appearance of the sky and the sun, inhomogeneities in color and luminance are avoided or at least reduced in order to preserve the desired optical and visual effect. On the other side, a mirror-like facade may—similar to large windows—disadvantageously not be recognized by birds flying against and impacting on the facade that is, for example, perceived as the sky.

Thus, the present disclosure is directed, at least in part, to improving or overcoming one or more aspects of prior systems.

In a first aspect, the present disclosure is directed to a lighting system comprises a light source, and a chromatic reflective unit. The chromatic reflective unit comprises a reflective layer, and a chromatic diffusing layer having a back side provided at the reflective layer and a front side for being illuminated by incident light from the light source, wherein the chromatic diffusing layer comprises a plurality of nanoparticles embedded in a matrix, and the chromatic reflective unit is configured to provide for a specular reflectance that is larger in the red than in the blue, and for a diffuse reflectance that is larger in the blue than in the red, wherein said nanoparticles have an average size d in the range 10 nanometers (nm)≤d≤240 nm, the ratio between the blue and red scattering optical densities Log [R(450 nm)]/Log [R(630 nm)] of the chromatic reflective unit falls in the range 5≥γ≥2.5, where R(λ) is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range 10 nm≤d≤240 nm, and along the direction normal to the reflective layer, the number N of nanoparticles per unit area is given by $$N \geq N_{min} = \frac{2.07 \times 10^{-29}}{D^6} \left| \frac{m^2+2}{m^2-1} \right|^2 \text{ [meters-2] and } N \leq N_{max} = \frac{1.21 \times 10^{-27}}{D^6} \left| \frac{m^2+2}{m^2-1} \right|^2 \text{ [meters-2]},$$

D being the effective particle diameter given in meters. Furthermore, the chromatic reflective unit is shaped as a rotational paraboloid or a portion of a rotational paraboloid, and the light source is positioned close to or at the paraboloid focal position.

In another aspect, a lighting system comprises a chromatic reflective unit, and a light source, wherein the chromatic reflective unit is shaped as a rotational paraboloid or a portion of a rotational paraboloid, and the light source is positioned close to or at the paraboloid focal position.

Further embodiments of the above aspects, are disclosed in the claims, which are incorporated herein by reference.

For example, in some embodiments, the reflective structural unit is based on a mirror structure as disclosed in the above mentioned international patent application WO 2015/172821 A1, which is incorporated herein by reference. In particular, international patent application WO 2015/172821 A1 discloses a mirror with a mirroring surface and a diffusing layer, in front of the mirroring surface that is used, for example, to illuminate an object of an exhibition in a sun-like manner. The diffusing layer preferentially scatters short-wavelength components of impinging light with respect to long-wavelength components of the impinging light. For example, the scattering occurs in the Rayleigh or extended Rayleigh-like regime.

With respect to the chromatic diffusing layer of the reflective structural unit, the present disclosure relates to an optical diffuser as disclosed in WO 2009/156348 A1, filed by the same applicants, as a sky-sun nanodiffuser in the noon configuration. Therein the term "sky-sun nanodiffuser" designates an optical diffuser that simulates the diffusion of the sunlight by the sky in nature. Accordingly, the herein disclosed chromatic reflective unit may relate in some embodiments to an optical nanodiffuser of that type disclosed in WO 2009/156348 A1 that comprises an essentially transparent solid matrix in which a plurality of solid transparent nanoparticles are dispersed, e.g. in a thin film, coating, or bulk material such as sandwich embodiments. In the present description the terms "diffusing layer", "nanodiffuser", and in actively illuminated embodiments "chromatic diffusing layer" designate in general an optical element, which comprises a matrix embedding those (essentially transparent) nanoparticles.

The chromatic diffusing layer is in principle capable of (chromatically) separating different chromatic components of incident light having a broad spectral bandwidth (such as in general white light) according to the same mechanism that gives rise to chromatic separation in nature. Rayleigh scattering is creating, for example, the spectral distribution characteristic of skylight and sunlight. More particularly, the chromatic diffusing layer is capable of reproducing—when subject to visible white light—the simultaneous presence of two different chromatic components: a diffused sky-like light, in which blue—in other words the blue or "cold" spectral portion—is dominant, and a transmitted and by the reflective surface reflected incident light, with a reduced blue component—in other words the yellow or "warm" spectral portion.

Referring to reflecting properties of a chromatic reflective section of the chromatic reflective unit, its structure is such that it achieves—based on the nanoparticles—such a specific optical property that comprises a specular reflectance that is larger in the red than in the blue, and a diffuse reflectance that is larger in the blue than in the red. The optical property can be fulfilled, for example, over at least 50% of the reflective surface section, preferably over at least 70%, or even over at least 90%.

Herein, as defined in the Standard Terminology of Appearance, ASTM international, E 284-09a, the reflectance is in general the ratio of the incident flux to the incident flux in the given conditions. For example, the diffuse reflectance is a property of the respective specimen that is given by the ratio of the reflected flux to the incident flux, where the reflection is at all angles within the hemisphere bounded by the plane of measurement except in the direction of the specular reflection angle. Similarly, the specular reflectance is the reflectance under the specular angle, i.e. the angle of reflection equal and opposite to the angle of incidence. In the context of the present disclosure, for a given wavelength and a given position on the reflective surface section, the diffuse reflectance and the specular reflectance are intended for non-polarized incident light with an incident angle of 45° with respect to the normal to the reflective surface section at the given position. For measurements, the angular size of the detector for the measurement of specular reflection and the angular aperture of the incident beam is selectable in a range as it will be apparent to the skilled person. In particular when considering (white light) low angle diffusers, for example, the angular size of the detector for the measurement of specular reflection and the angular aperture of the incident beam should be configured so that the sensor accepts rays with a reflection within a cone around the reflection axis. In some embodiments, an angular aperture of 2 times 0.9° may be used as disclosed, for example, in BYK-Gartner "Perception and Objective Measurement of Reflection Haze" for hazemeters and glossmeters introduction, Friedhelm Fensterseifer, BYK-Gardner, BYK-Gardner Catalog 2010/2011).

Moreover, the reflected flux is averaged over all possible incidence azimuthal angles. In case the measurement of the diffused reflectance and/or the specular reflectance is hindered by geometrical or other physical constraints related to the configuration of the chromatic reflective unit, the skilled person may have access to the above mentioned quantities by forming at least one separate chromatic reflective section from the chromatic reflective unit and measuring the reflectance directly onto that section. For details of microscopic structural properties, it is referred to, for example, the above mentioned publication WO 2009/156348 A1. However different values of microscopic parameters may be applicable. For example, one may apply parameters that lead to a larger amount of scattered light with respect to non-scattered light. Similarly, in the aim of minimizing or at least reducing the visibility of the specular reflected scene, one may prefer increasing the contribution to the luminance of the chromatic reflective unit due to diffused light in spite of the fact that the resulting perceived color may depart from the color of a perfect clear sky. The latter may be caused by reducing the level of color saturation as a consequence of the multiple scattering arising therein and may be even caused at concentrations below the concentration giving rise to multiple scattering.

In the following, some microscopic features are summarized exemplarily.

The chromatic effect is based on nanoparticles having a size in the range from, for example, 10 nm to 240 nm. For example, an average size may be in that range.

A transparent optical element comprises a transparent matrix and transparent nanoparticles having different refraction index with respect to the matrix, and having sizes (significantly) smaller than visible wavelength, will preferentially scatter the blue part (the blue) of the spectrum, and transmit the red part (the red). While the wavelength-dependence of the scattering efficiency per single particle approaches the $\lambda^{-4}$ Rayleigh-limit law for particle sizes smaller or about equal to $\frac{1}{10}$ of the wavelength $\lambda$, a respective acceptable optical effect may be reached already in the above range for the size of the nanoparticles. In general, resonances and diffraction effects may start to occur at sizes larger, for example, half the wavelength.

On the other side, the scattering efficiency per single particle decreases with decreasing particle size d, proportional to $d^{-6}$, making the usage of too small particle inconvenient and requiring a high number of particles in the propagation direction, which in turn may be limited by the allowed filling-fraction. For example, for thick scattering layers, the size of the nanoparticles embedded in the matrix (and in particular their average size) may be in the range from 10 nm to 240 nm, such as 20 nm to 100 nm, e.g. 20 nm to 50 nm, and, for compact devices, e.g. using thin layers such as coatings and paints, the size may be in the range from 10 nm to 240 nm, such as 50 nm to 180 nm, e.g. 70 nm to 120 nm.

In some embodiments, larger particles may be provided within the matrix with dimensions outside that range but those particles may not affect the Rayleigh-like feature and, for example, only contribute to forming a low-angle scattering cone around the specular reflection.

The chromatic effect is further based on nanoparticles having a refractive index that is different than the refractive index of the embedding matrix. To scatter, the nanoparticles have a real refractive index $n_p$ sufficiently different from that of the matrix $n_h$ (also referred to as host material) in order to allow light scattering to take place. For example, the ratio m between the particle and host medium refractive indexes (with $$m \equiv \frac{n_p}{n_h})$$

may be in the range $0.5 \leq m \leq 2.5$ such as in the range $0.7 \leq m \leq 2.1$ or $0.7 \leq m \leq 1.9$.

The chromatic effect is further based on the number of nanoparticles per unit area seen by the impinging light propagating in the given direction as well as the volume-filling-fraction f. The volume filling fraction f is given by $$f = \frac{4}{3}\pi \left(\frac{d}{2}\right)^3 \rho$$

with $\rho$[meter$^{-3}$] being the number of particles per unit volume. By increasing f, the distribution of nanoparticles in the diffusing layer may lose its randomness, and the particle positions may become correlated. As a consequence, the light scattered by the particle distribution experiences a modulation which depends not only on the single-particle characteristics but also on the so called structure factor. In general, the effect of high filling fractions is that of severely depleting the scattering efficiency. Moreover, especially for smaller particle sizes, high filling fractions impact also the dependence of scattering efficiency on wavelength, and on angle as well. One may avoid those "close packing" effects, by working with filling fractions $f \leq 0.4$, such as $f \leq 0.1$, or even $f \leq 0.01$ such as f=0.001.

The chromatic effect is further based on a number N of nanoparticles per unit area of the chromatic diffusive layer in dependence of an effective particle diameter D=dn$_h$. Thereby, d [meter] is the average particle size defined as the average particle diameter in the case of spherical particles, and as the average diameter of volume-to-area equivalent spherical particles in the case of non-spherical particles, as defined in [T. C. GRENFELL, AND S. G. WARREN, "Representation of a non-spherical ice particle by a collection of independent spheres for scattering and absorption of radiation". Journal of Geophysical Research 104, D24, 31,697-31,709. (1999)]. The effective particle diameter is given in meters or, where specified in nm.

In some embodiments:

$$N \geq N_{min} = \frac{2.07 \times 10^{-29}}{D^6} \left|\frac{m^2+2}{m^2-1}\right|^2 [\text{meters}^{-2}],$$

(D given in [meters]) and $$N \leq N_{max} = \frac{1.21 \times 10^{-27}}{D^6} \left|\frac{m^2+2}{m^2-1}\right|^2 [\text{meters}^{-2}];$$

for example, $$N \geq N_{min} = \frac{4.24 \times 10^{-29}}{D^6} \left|\frac{m^2+2}{m^2-1}\right|^2 [\text{meters}^{-2}] \text{ and } N \leq N_{max} =$$

$$\frac{9.27 \times 10^{-28}}{D^6} \left|\frac{m^2+2}{m^2-1}\right|^2 [\text{meters}^{-2}],$$

more specifically $$N \geq N_{min} = \frac{8.99 \times 10^{-29}}{D^6} \left|\frac{m^2+2}{m^2-1}\right|^2 [\text{meters}^{-2}] \text{ and } N \leq N_{max} =$$

$$\frac{6.48 \times 10^{-27}}{D^6} \left|\frac{m^2+2}{m^2-1}\right|^2 [\text{meters}^{-2}].$$

For example, for embodiments aiming at simulating the presence of a pure clear sky, $$N \geq N_{min} = \frac{2.07 \times 10^{-29}}{D^6} \left|\frac{m^2+2}{m^2-1}\right|^2 [\text{meters}^{-2}],$$

(D given in [meters]) and $$N \leq N_{max} = \frac{3.69 \times 10^{-28}}{D^6} \left|\frac{m^2+2}{m^2-1}\right|^2 [\text{meters}^{-2}]$$

such as $$N \geq N_{min} = \frac{4.24 \times 10^{-29}}{D^6} \left|\frac{m^2+2}{m^2-1}\right|^2 [\text{meters}^{-2}] \text{ and } N \leq N_{max} =$$

$$\frac{2.79 \times 10^{-28}}{D^6} \left|\frac{m^2+2}{m^2-1}\right|^2 [\text{meters}^{-2}],$$

more specifically $$N \geq N_{min} = \frac{8.99 \times 10^{-29}}{D^6} \left|\frac{m^2+2}{m^2-1}\right|^2 [\text{meters}^{-2}] \text{ and } N \leq N_{max} =$$

$$\frac{2.06 \times 10^{-28}}{D^6} \left|\frac{m^2+2}{m^2-1}\right|^2 [\text{meters}^{-2}],$$

In other embodiments aiming at minimizing the contribution of a specular reflected scene, $$N \geq N_{min} = \frac{2.07 \times 10^{-29}}{D^6} \left|\frac{m^2+2}{m^2-1}\right|^2 [\text{meters}^{-2}].$$

(D given in [meters]) and $$N \leq N_{max} = \frac{1.21 \times 10^{-27}}{D^6} \left|\frac{m^2+2}{m^2-1}\right|^2 [\text{meters}^{-2}]$$

such as $$N \geq N_{min} = \frac{3.69 \times 10^{-28}}{D^6} \left|\frac{m^2+2}{m^2-1}\right|^2 \; [\text{meters}^{-2}]$$

and $$N \leq N_{max} = \frac{9.27 \times 10^{-28}}{D^6} \left|\frac{m^2+2}{m^2-1}\right|^2 \; [\text{meters}^{-2}],$$

more specifically $$N \geq N_{min} = \frac{4.85 \times 10^{-28}}{D^6} \left|\frac{m^2+2}{m^2-1}\right|^2 \; [\text{meters}^{-2}]$$

and $$N \leq N_{max} = \frac{6.48 \times 10^{-28}}{D^6} \left|\frac{m^2+2}{m^2-1}\right|^2 \; [\text{meters}^{-2}].$$

With respect to those physical parameters and their general interplay, it is again referred to, for example, WO 2009/156348 A1.

The macroscopic optical properties of the chromatic reflective unit disclosed herein, and in particular a chromatic reflective section, can be described in terms of the two following quantities:

(i) The monochromatic normalized specular reflectance $R(\lambda)$, defined as the ratio between the specular reflectance of the chromatic reflective unit and the specular reflectance of a reference sample identical to the chromatic reflective unit except for the fact that the diffusing layer does not contain the nanoparticles having a size in the range from 10 nm to 240 nm, i.e. the nanoparticles which are responsible of preferentially diffusing the short wavelengths of the impinging radiation.

(ii) The ratio $\gamma$ between the blue and the red optical densities defined as: $\gamma = \text{Log}\,[R(450\,\text{nm})]/\text{Log}\,[R(630\,\text{nm})]$ that measures the capacity of the chromatic reflective device to provide chromatic separation between long and short wavelength components of the impinging radiation.

In some embodiments, the chromatic reflective unit, and in particular a chromatic reflective section, may have:

R(450 nm) in the range from 0.05 to 0.95, for example from 0.1 to 0.9 such as from 0.2 to 0.8. For example for embodiments aiming at simulating the presence of a pure clear sky, R(450 nm) may be in the range from 0.4 to 0.95, for example from 0.5 to 0.9 such as from 0.6 to 0.8.

In embodiments aiming at reducing (e.g. minimizing) the contribution of a specular reflected scene, R(450 nm) may be in the range from 0.05 to 0.5, for example from 0.1 to 0.4 such as 0.2 up to 0.3.

With respect to the ratio $\gamma$ between the blue and the red optical densities in some embodiments, $\gamma$ may be in the range $5 \geq \gamma \geq 1.5$, or even $5 \geq \gamma \geq 2$, or even $5 \geq \gamma \geq 2.5$ such as $5 \geq \gamma \geq 3.5$.

For completeness, regarding the use in an outside environment, inorganic particles suited for this type of application may be those that include but are not limited to ZnO, TiO$_2$, ZrO$_2$, SiO$_2$, and Al$_2$O$_3$ which have, for example, an index of refraction $n_p$=2.0, 2.6, 2.1, 1.5, and 1.7, respectively, and any other oxides which are essentially transparent in the visible region. In the case of inorganic particles, an organic matrix or an inorganic matrix may be used to embed the particles such as soda-lime-silica glass, borosilicate glass, fused silica, polymethylmethacrylate (PMMA), and polycarbonate (PC). In general, also organic particles may be used, in particular for illuminated configurations having, for example, a reduced or no UV portion.

The shape of the nanoparticle can essentially be any, while spherical particles are most common.

As mentioned above, the nanoparticles and/or the matrix and/or further embedded particles may not—or may only to some limited extent—absorb visible light. Thereby, the luminance and/or the spectrum (i.e. the color) of the light exiting the chromatic reflective unit may only be very little or not at all affected by absorption. An essentially wavelength-independent absorption in the visible spectrum may be acceptable.

Combining the above features of the chromatic diffusing layer with the structural features disclosed herein may allow addressing one or more aspects of the prior art as will be exemplarily described below for various exemplary embodiments.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 2 is a schematic top view of an exemplary chromatic reflective unit with a plurality of reflective surface sections;

FIG. 3(a) and FIG. 3(b) are schematic cross-sections of the chromatic reflective unit shown in FIG. 1 illustrating the contributions of diffused light and specular reflected light for the appearance;

FIGS. 16(a)-16(f) are an illustration of an illumination system using a chromatic reflective unit having small scale random-like oriented reflective surface sections including exemplary surface structures.

DETAILED DESCRIPTION

Figure 1A:
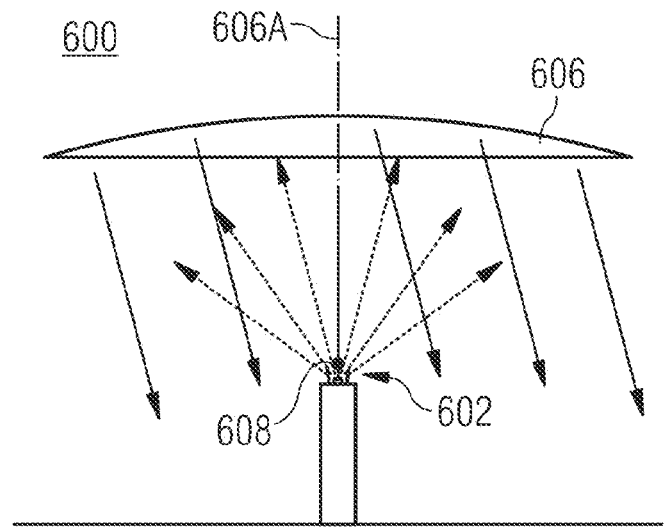
FIGS. 1A and 1B are schematic illustrations of an exemplarily sky-dome lighting system using a Rayleigh-like scattering panel in reflection configuration.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that in systems like those described in the above mentioned WO 2015/172821 A1 the specular reflection of a surrounding scene, as for example a scene of a recognizable indoor or outdoor environment or any scene featuring a spatially structured luminance distribution, is superimposed as a background to the blue scattered light. This may result in a degradation of color uniformity and luminance uniformity of light emitted by the device, and therefore also in a spoiling of the desired perception of an infinitely deep sky.

The disclosure is based in part on the realization that one can control the visual appearance of a chromatic reflective unit by providing an optical unit that prevents or at least reduces such as minimizes the impact of unwanted contribution to the specular reflected image from the structured luminance distribution of the surrounding scene as that provides a warmer (yellow) contribution superimposed as a background to the colder (blue) scattered light.

It was further realized that the color-spoiling effect of the specular reflection of bright objects in the surrounding scene may be reduced and even overcome, when one reduces the geometric homogeneity of the reflecting surface. For example, providing a random orientation of reflective surface sections will avoid a clear image of a reflected area. Herein, a random orientation of reflective surface sections is understood as not being uniform. For example, in view of the limited number of reflective surface sections, a discrete number of orientations (inclination angles/incident angles) may be selected and the reflective surface sections may be associated individually or in groups to the orientations.

Similarly, providing subsets of reflecting surface sections having essentially identical orientation within a subset but different orientation between subsets similarly may avoid the appearance of a clear reflected image (or provide the same to be viewable at different positions as discussed below). Accordingly, those structures may allow maintaining the specific depth perception that can be provided by chromatic reflective units as disclosed herein.

The disclosure is further based in part on the realization that—by providing a plurality of reflective surface section—one may enlarge and/or focus a reflected area to a respective larger or smaller observation area. Thereby, the sun-sky-impression may be accessible from an enlarged observer area.

The disclosure is further based in part on the realization that one may favorably combine the two components of diffuse light and specular reflected light by providing a specific contribution of the specular reflected light via the reflective surface(s) to the perceived appearance by suitable configuring the reflective surface.

In other words, the disclosure is further based in part on the realization that a plurality of chromatic reflective surface sections may be configured (sized and oriented) to provide for a sky-like chromatic separation in the presence of a non-uniform illumination by broad spectrally distributed light, thereby producing an output chromatic and luminance distribution of light resembling the visual appearance of the real sky.

The herein described configurations of a chromatic reflective unit may be applied in an embodiment herein referred to as sky-dome lighting system 600, which is described in connection with FIGS. 1A and 1B. In the following, various embodiments of a chromatic reflective unit are disclosed in connection with FIGS. 2 to 17. For example, the use of chromatic reflective units within active illumination concepts is disclosed in connection with FIGS. 16 and 17. It is noted, however, that features of, for example, outdoor façade applications may similarly apply to indoor applications. Similarly, features of non-illuminated applications may apply to illuminated applications as will be apparent to the skilled reader.

Referring to FIG. 1A, the sky-dome lighting system 600 comprises a chromatic reflective unit 606 shaped as a rotational paraboloid or a portion of a rotational paraboloid. Chromatic reflective unit 606 is in the following referred to as "chromatic reflective paraboloid 606". Lighting system 600 comprises further a light source 602 such as a light projector positioned close to or at the paraboloid focal position of chromatic reflective paraboloid 606. Lighting system 600 is configured to allow an observer walking below the chromatic reflective paraboloid 606 to perceive a sky above him/her and a sun at infinite distance.

Lighting system 600 is configured to strongly collimate the reflected light, which may have, for example, an overall beam divergence smaller than 30°, such as smaller than 20°, or even smaller than 10°. Accordingly, the illuminance produced by the reflected light component on a surface orthogonal to the axis 606A of the paraboloid 606 may not decrease, or may decrease very weakly, with an increase of the distance of such surface from the reflecting surface of the paraboloid 606. In other terms, lighting system 600 provides an illuminance onto that illuminated surface which is substantially higher than the illuminance generated in the case of a plane chromatic mirror, i.e. in the case of a chromatic reflective unit shaped as a plane element.

Due to the high illuminance, the luminance of the illuminated area, i.e. the luminance of the spot, is normally higher than the luminance generated in the case of a plane chromatic mirror unit. The luminance of the image reflected from the reflective paraboloid is proportional to the luminance of the objects inside the illuminated area. An observer that looks into the chromatic reflective paraboloid 606 will see, besides the diffuse bluish component which mimics the sky, also the image of the reflected scene that is strongly illuminated. The ratio of the luminance of the diffuse bluish light component with respect to the luminance of the reflected scene will be smaller than in the case of a plane chromatic mirror unit.

On the other side, shaping the chromatic reflective unit 606 as a rotational paraboloid and positioning light source 602 close to or at the focus 608 of the paraboloid 606 has the advantage of positioning the virtual image of the sun at (almost) infinite distance from the observer. This is good for the purpose of imitating the effect of sun in nature, but has—as explained herein—the disadvantage of superimposing to the image of the sky a strong luminous reflected image of the scene. This may work against the intended sun-sky-imitation, because it is not a natural effect.

In some embodiments, chromatic reflective paraboloid may comprise a low-angle white-light diffusing layer, which acts as a low-band pass filter and, therefore, blooms any image, including the image of the source and the image of the ambience (scene). As a consequence, the visibility of the reflected scene may be strongly reduced.

Figure 17:
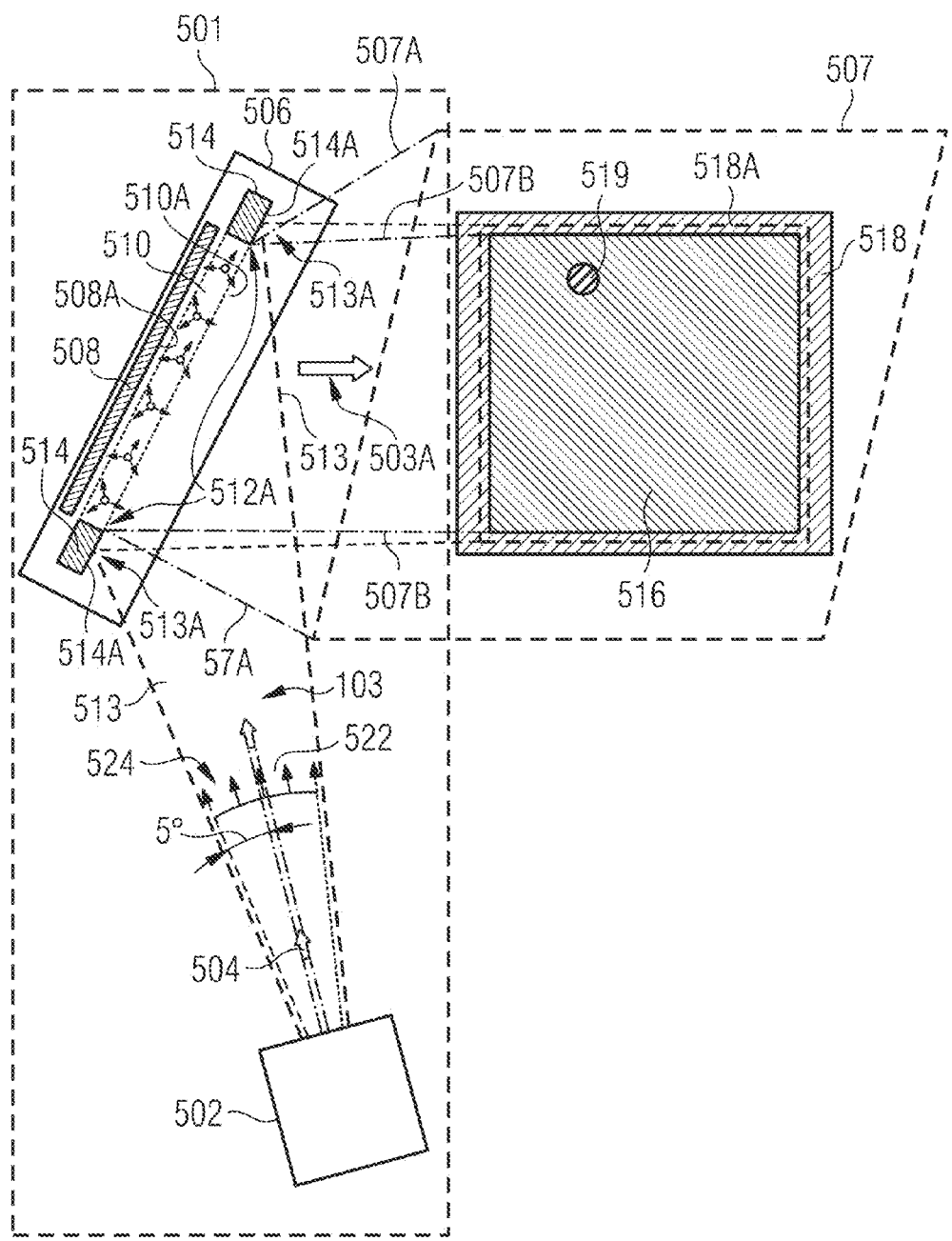
FIG. 17 is a schematic illustration of an exemplarily lighting system using a Rayleigh-like scattering panel in reflection configuration.

For example, the white-light low-angle diffuser can be a layer deposited onto the reflective layer (see FIG. 17 analogous for the planar embodiment of reflective layer 508), or onto the chromatic diffusing layer (see FIG. 17 analogous for the planar embodiment of chromatic diffusing layer 510). The white-light low-angle diffuser may be configured to have a substantially uniform interaction cross-section with respect to wavelength of the impinging light. However, the interaction property may be such that each interaction event with an inbound impinging light ray merely leads to a relatively small change in the propagation direction of the light ray from the direction of exact specular reflection. For example, a typical change in direction within a blurring angle may be not larger than 30°, such as not larger than 20°, or even not larger than 10°, with a blurring efficacy >50%, such as >70%, or even >90%. The blurring efficacy is understood in the sense that at least 50%, 70% or 90%, respectively of the imping light rays experience a deviation within the specified blurring angular range.

In some embodiments, the white-light low-angle diffuser layer may be incorporated into the chromatic diffusing layer. For example, the diffusing layer may comprise a first dispersion of light-scattering centers of an average size smaller than 250 nm, which preferentially scatters the short-wavelength component of the impinging light at any angle, producing a Rayleigh-like effect. The diffusing layer may further comprise a second dispersion of light-scattering centers or nanoparticles, with an average size which is, for example, about or more than 5 times larger, such as about or more than 10 times larger, or about or even more than 15 times larger, or even about or more than 50 times larger than the average size of the light scattering centers or nanoparticles forming the first dispersion. The second dispersion is configured to scatter the light at low angle essentially independently over the wavelength range of the impinging light.

In some embodiment, the size of the light scattering centers forming the second dispersion will be selected so as to be larger than 1 micrometer ($\mu$m), such as larger than 2 $\mu$m, or larger than 3 $\mu$m or even larger than 10 $\mu$m. Both dispersions may use a transparent polymer layer, even the same type of polymer, as the matrix. In this regard, both dispersions may be provided within the same matrix layer, e.g. a transparent polymer layer, so that the just outlined blurring characteristic could be included by the chromatic diffusing layer.

Another possibility of achieving the just mentioned blurring effect is obtained by making the chromatic diffusing layer featuring a physical and/or optical thickness which varies laterally, for example by the use of a (micro-) surface structure of one or more of the layers forming the reflective unit. See also the embodiments of FIG. 16. The effect of said thickness variation is that of providing scattering centers which, due to the effect of refraction and/or diffraction, are capable of providing an efficient bending of the impinging light rays. For what concerns the amount of produced angular deviation, e.g. the blurring angle, it is well known by elementary scattering theory how this can be computed as a function of the transverse size and of the depth of the thickness modulation (intuitively: smaller size and larger depth produce larger angular deviation).

For what concerns the blurring efficiency, the present approach based on the thickness modulation, such as surface structures, allows to obtain large figures more easily than the previous approach based on usage of a second dispersion of scattering centers, because said structures can be easily configured in order to minimize and almost avoid the presence of flat profiles, i.e. of non-modulated portions of the chromatic diffusing layer optical thickness.

However, in spite of the fact that the thickness-modulation approach is routinely used at the industrial level for blurring filter production, the cost of the technology may be higher than for the previous case based on the second dispersion. Therefore, in a way which is known to the expert of the field, the profile of the thickness modulation can be configured in order to obtain a blurring angle of about 30° or less, such as about 20° or less, or 10° or less or even 3°, while providing a blurring efficacy of >50%, or >70%, or even >90%, or even higher than 97%.

For example, the thickness modulation may have an average spatial frequency in the range of 10-200, preferably 20-1000, more preferably 40-500 modulations/mm, and a ratio between the depth and the transverse size of the thickness modulation in the range 0.05-2, preferably 0.1-1. However, different examples concerning modulation depth and spatial frequency are also possible, the quoted values being only indicative of the most frequent figures currently used in blurring-filter technology.

When using the paraboloid chromatic reflective unit equipped with the low-angle white-light diffuser, in the observer's eye, the resulting perceived scene, i.e. the image, is blurred, i.e. it is effectively low-pass filtered. In so doing, steep brightness gradients in the sky-like region caused by the reflected scene, as for example caused by the contours of an object in the reflected image, are effectively reduced. In other terms, the negative effect caused by the high luminance produced onto the illuminated spot by the paraboloid reflector can be removed at least in part by means of the effect of the low-angle white-light diffusing layer.

It is noted that the above disclosed aspects regarding the low-angle white-light diffusing layer are similarly applicable to the embodiments disclosed herein.

Figure 1B:
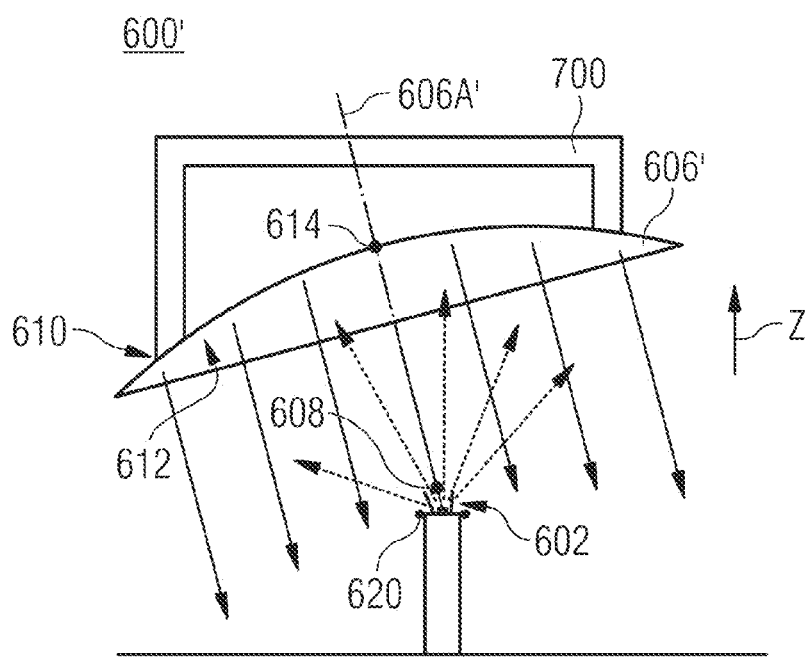

In further embodiments—such as the one shown in FIG. 1B, the chromatic reflective paraboloid may comprise a hanging tool 700, such has an appending device configured to append or hang a chromatic reflective paraboloid 606' so that an axis 606A' of the chromatic reflective paraboloid 606' is inclined with respect to the vertical direction Z by at least 10°, such as at least 20°, or even at least 30°.

For example the hanging tool 700 may comprise a plurality of hooks or rings, for example at least a plurality of hooks or rings, to be mounted to an external surface 610 of chromatic reflective paraboloid 606', i.e. a surface opposite with respect to the reflective surface 612.

This configuration corresponds to an off-axis lay out and reduces the probability that an observer positioned inside the illuminated spot sees the same illuminated spot or a portion of said illuminates spot reflected by the chromatic reflective paraboloid. In a certain embodiment, the inclination of the axis 606A' is obtained by shaping the chromatic reflective paraboloid as an off-axis section of a rotational paraboloid such as a portion of a rotational paraboloid which does not even contain the vertex 614. In those embodiments, one may suspend the chromatic reflective paraboloid with its outer perimeter which substantially lies in the horizontal plane.

In a different configuration, the inclination of the axis is obtained by shaping the chromatic reflective paraboloid as a section of a rotational paraboloid having the vertex substantially in the central position, but suspending the chromatic reflective paraboloid with its outer perimeter which substantially lies in a plane which is inclined with respect to the horizontal plane, for example by at least 10°, such as at least 20°, or even at least 30°.

In some embodiments, the lighting system comprises a support element configured to keep the light source elevated. For example, a light projector may be raised with its light emitting area to a height of at least 1.8 meters (m), such 2 m, or even more than 2.3 m from the ground. The elevated position may be important to avoid the risk that observers may look directly into the strong light source.

In combination with the paraboloid having the vertex substantially in the central position (such as above the projector), said support element may be configured to keep the light source (projector) inclined with respect to the horizontal plane, i.e. to keep it aligned in a way that the direction of its maximum luminous intensity is inclined with respect to the horizontal plane.

In combination with the paraboloid having the vertex shifted with respect in the central position/such as horizontally displace from the horizontal projector position), said support element may be configured to keep the projector aligned in a way that the direction of its maximum luminous intensity is the vertical one.

In certain embodiments, the light source is configured such that it emits light inside a cone targeting the chromatic reflective paraboloid. The full width angular divergence of the emission cone of the light source (projector) may be larger than 60°, for example larger than 90°, such as larger or around 120°.

In some embodiments, the light source is configured as a two-dimension array of LEDs and a circular reflective compound parabolic concentrator (CPC) with the LED array at the input face of the CPC. The circular CPC may be configured such that its emission output angle may be larger than 60°, for example larger than 90°, such as larger or around 120°.

In a further embodiment, the illumination system comprises an infrared (IR) light emitter in addition and different from the light source (projector). The IR light emitter substantially emits electromagnetic radiation in a wavelength range from 0.7 µm to 100 µm, for example from 0.8 µm to 20 µm, such as from 0.8 µm to 12 µm, free from visible components such as it contains a visible component having a power (Watts) less than 1%, such as 0.1% of the total power emitted by the IR light emitter. Said IR emitter might have IRA (infrared-A, wavelength 0.7-1.4 micron) power which is less than 30%, preferably less than 20% of the total output power. Such IR light emitter may comprise a Planckian emitter at temperature below 3000K, such as below 2000K. Said IR light emitter may comprise a low-pass IR transmittance visible-absorbing filter, such as a filter comprising a semiconductor with bandgap that absorbs light radiation at wavelengths smaller than 0.7 µm. Such IR light emitter may comprise an IR LED emitter such as LED emitting at wavelength 0.84 micron or LED emitting at 0.95 µm.

In some embodiments, the IR light emitter is positioned in the surrounding of the light source and has a reflector, such as a metal CPC reflector, configured to provide a full width angular divergence of the emission cone of the IR light larger than 60°, for example larger than 90°, such as larger or around 120°.

The following configurations of the chromatic reflective unit, although partly disclosed in different applications, may be applied in the sky-dome lighting system 600. For example, the chromatic reflective unit 606 comprises a structural feature and/or a Rayleigh-like scattering feature as disclosed with respect to any one of the aspects and embodiments of the following description, despite the difference in overall shape.

FIG. 2 shows a top view of a chromatic reflective unit 1 having a plurality of reflective surface sections 3' being covered by chromatic diffusing layer 5. Exemplarily, reflective surface sections 3' in FIG. 2 have a rectangular base shape and are arranged such that chromatic reflective unit 1 also has a rectangular base shape. However, other shapes may be applicable.

As will become apparent from the embodiments described in the following, reflective surface sections 3' may be connected by some type of transition surface sections or may be formed by structurally independent surface sections. Moreover, reflective surface section 3' may be planar surfaces in shape (exemplarily in FIG. 1 x- and y-coordinates are indicated) or may extend in 3D as a 3D-type surface such as a curved or partially curved surface. Reflective surface sections 3' may be formed by applying a reflective layer on a plurality of non-coplanar surface sections of a support structure.

Chromatic diffusing layer 5 comprises a plurality of nanoparticles embedded in a transparent matrix. The nanoparticles and the transparent matrix have a difference in the refractive index. That difference in the refractive index, the size distribution of the nanoparticles embedded in the matrix, and the number of nanoparticles per unit surface area are selected such that a specular reflectance is provided that is larger in the red (in the meaning of longer wavelengths of an incident broad spectrum) than in the blue (in the meaning of shorter wavelengths of an incident broad spectrum), and that a diffuse reflectance is provided by a chromatic reflective section 6 (formed by a combination of a reflective surface section 3' with that section of chromatic diffusing layer 5 being in front of the respective reflective surface section 3') that is larger in the blue than in the red.

FIGS. 3(*a*) and 3(*b*) show schematic cross-sections of chromatic reflective unit 1 of FIG. 2 for illustrating the optical features (see section (a) of FIG. 3) and the optical appearance as affected by the specular reflected image (see section (b) of FIG. 3). The cross-section illustrates a saw-like shape being given in the direction of the cross-section, wherein the y-coordinate defines the direction of the cross-section. As can be seen in FIGS. 3(*a*) and 3(*b*), reflective surface sections 3' of chromatic reflective sections 6 form in y-direction a sequence of surface sections being regularly displaced with respect to each other in y-direction and are inclined with respect to the y-direction. Accordingly, reflective surface sections 3' indicated in FIG. 2 are non-coplanar with respect to each other as they do not lie in a common plane.

It is noted that neighboring reflective surface sections in x-direction (see FIG. 1) may in principle be coplanar, or a subgroup of the same may be coplanar as will be described below. However, also in x-direction a similar cross-sectional behavior as discussed below may be present.

Referring to FIGS. 3(*a*) and 3(*b*), chromatic reflective unit 1 comprises—in a compact configuration—a substrate 7 that is shaped such that the respectively formed and oriented chromatic reflective sections 6 can be provided on its surface. Substrate 7 may be a casted polymeric layer such as foam having a back layer such as metals (e.g. aluminum or steel) and in some cases a layer of PVC may also be added. The provided saw tooth-like bended shape of substrate 7 is transferred to the shape of an applied reflective layer 3.

Reflective surface sections 3' may be sections of a continuous reflective layer 3 such as a reflective coating or a reflective foil provided on substrate 7—acting as a support structure. In some embodiments, the reflective layer may be applied specifically onto respective surface sections 7'. On that reflective layer, chromatic diffusing layer 5 is applied, for example also as a continuous layer. In FIG. 3(*a*) and FIG. 3(*b*), reflective layer 3 and chromatic diffusing layer 5 are illustrated by a single line. Each "saw-tooth" of substrate 7 includes a surface section 7', being the basis for a reflective surface sections 3' and, thus, for a chromatic reflective section 6.

Referring to FIG. 3(*a*), chromatic reflective unit 1 reflects incident light 9 with reflective surface sections 3' after the light having passed chromatic diffusing layer 5 such that specular reflected light has passed chromatic diffusing layer 5 twice. As shown in FIG. 3(*a*), incident light 9 may be not-directed light that falls onto chromatic reflective unit 1 from the right side in FIG. 3(*a*).

As discussed above, chromatic diffusing layer 5 is constructed such that it preferentially scatters short-wavelength components of incident light 9 with respect to long-wavelength components of incident light 9. The scattered light is referred herein as diffuse light 11 and it is associated with a blue (short-wavelength) color assuming a given selection of the scattering conditions of the nanoparticles.

In FIG. 3(*a*), an exemplary viewing direction 13 of an observer is indicated. In viewing direction 13, the observer will see the portion of diffuse light 11 that is emitted in his direction because diffuse light 11 is essentially homogenously emitted in all directions from chromatic diffusing layer 5. Clearly, those portions being emitted towards reflective surface sections 3' are reflected and may also be seen when looking at chromatic reflective unit 1. In addition, the observer sees the transmitted specular reflected light 15 (being "yellow" as discussed above due to the scattering of the blue components). The seen specular reflected light 15 is based on that portion 9A of incident light 9 that is redirected by chromatic reflective unit 1 to face viewing direction 13 of the observer. The redirection may include pure specular reflection as well as the forward scattering addressed before.

As a consequence of the embedded nanoparticles, that portion of incident light 9, which is regularly reflected at reflective surface sections 3' without being deviated by scattering interaction with chromatic diffusing layer 5, has a visible spectrum that differs from the spectrum of incident light 9 in an associated center of mass-wavelength because the spectrum is shifted towards longer wavelengths (i.e. to the red giving a yellow tone). The portion of incident light 9, which is subject to the essentially Rayleigh-like scattering by the nanoparticles, is emitted in a diffuse manner, thereby leading to substantially homogeneous luminance in all the directions pointing away from its surface. It is noted that the diffuse light is based on the complete luminance to which chromatic reflective unit 1 is subjected from any direction. In other words, all light incident on chromatic reflective unit 1 contributes to the diffuse light, irrespective of the direction under which the light is incident.

As a consequence, the light seen when looking at chromatic reflective unit 1 under a certain direction (such as viewing direction 13 in FIG. 3(*a*)) comprises a superposition of light being specular reflected and diffuse light generated by the scattering and being scattered towards the respective direction. As will be apparent, an observer looking onto chromatic reflective unit 1 from some viewing angle may have a perception as if the observer looks into the blue sky in case the chromatic separation provided by chromatic reflective unit 1 includes a "dominant" diffuse light component. In contrast, he may have a perception as if he looks into the sun or into an object illuminated by the sun, e.g. bright clouds, in case the chromatic separation provided by the chromatic reflective unit includes a dominant specular reflected component. Accordingly, the luminance of perceived reflected portion 9A of incident light 9 is relevant for the respective color impression perceived by the observer as explained in the following in connection with FIG. 3(*b*).

Assuming the case of a façade of a building being formed by a chromatic reflective unit as disclosed herein, the orientation of the chromatic reflective unit is shown in FIG. 3(*b*). Chromatic reflective sections 6A, 6B may be associated with respective normals n. As shown in FIG. 3(*b*), normals n are oriented towards the ground.

As will be explained exemplarily in the context of a façade application below, an observer standing on the ground, i.e. below chromatic reflective unit 1, preferentially sees the lower part of the façade (chromatic reflective sections 6A) as being blueish, while the top part of the façade (chromatic reflective sections 6B)—causing the observer to see the specular reflection of the high bright sky—is seen as being yellowish. It is noted that the ratio between the bluish and the yellowish contributions as seen by the observer may be varied by changing the inclination of the reflective surface sections 3'. The ratio may increase (i.e. more bluish perception) with the increase of the angle between the normal n of the respective reflective surface section 3' and the normal to the wall of the building.

Specifically, an observer (illustrated by dot 8 in FIG. 3(*b*)) looking in the direction 13A at chromatic reflective section 6A of chromatic reflective unit 1, sees reflected along a direction 13A' of specular reflection a dark object 10, e.g. sees the ground. Consequently, chromatic reflective section 6A appears blue to the observer. In fact, the luminance of chromatic reflective section 6A as seen by the observer along direction 13A has a low contribution due to the specular reflection, i.e. a low yellow (long-wavelength) component. For that reason, the main contribution to the luminance of chromatic reflective section 6A along direction 13A is the contribution of the Rayleigh-like scattered light, i.e. the contribution of the light impinging from any direction onto chromatic reflective section 6A, which is eventually scattered against the direction 13A along which the observer is looking.

In contrast, the observer, when looking in a direction 13B at chromatic reflective section 6B of chromatic reflective unit 1, sees reflected along the direction 13B' of specular reflection a bright object 12, e.g. a luminous over-casted, white sky. Consequently, the luminance of chromatic reflective section 6B along direction 13B has a strong contribution due to the specular reflection, i.e. a strong yellow (long-wavelength) component. For that reason, the main contribution to the luminance of chromatic reflective section 6B as seen by the observer is the contribution of the reflected light. Consequently, chromatic reflective section 6B appears yellow to the observer.

In certain embodiments, the chromatic reflective unit may be sufficiently large or comprise a plurality of abutted chromatic reflective sections 6 to be considered onto a façade so that the following conditions are met:

1. The characteristic of the luminance distribution of the light, which illuminate the chromatic reflective section or the plurality of chromatic reflective sections may change, e.g. in angle and/or intensity over the x-y plane (x-y as defined in FIG. 1). For example, the lower portion of a chromatic reflective unit may be less illuminated than the upper.

2. An observer looking at the chromatic reflective section or the plurality of chromatic reflective sections sees different portions under significantly different viewing angles.

The first and/or the second condition may cause different portions of a chromatic reflective section or different chromatic reflective sections to be seen by the observer in different colors as described above.

Figure 4:
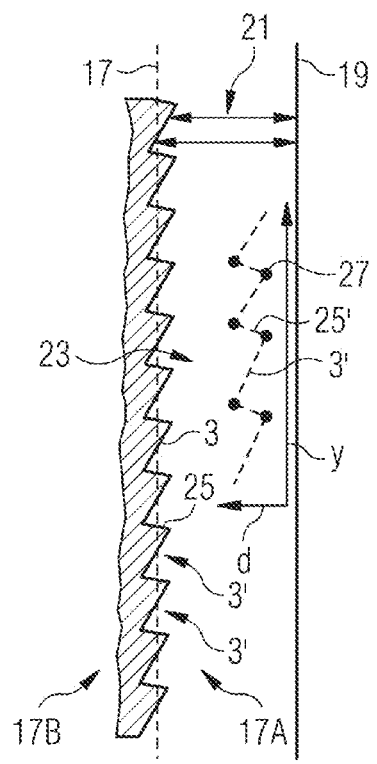
FIG. 4 is an illustration for defining the surface shape of a reflective surface based on the cross-section shown in FIG. 3.

FIG. 4 is an illustration for explaining the aspect of the non-coplanar orientation of reflective surface sections 3'.

In general, the shape of a chromatic reflective unit can be associated with a surface-type as in general the shape extends layer-like in two directions. Thus, herein the surface-type is understood as the type of (3D-) surface that a chromatic reflective unit embodies. The surface-type can be of any surface shape such as a planar surface (corresponding to a panel shape of the chromatic reflective unit as illustrated in FIG. 4 in a cross-sectional view) or curved surface (corresponding, for example, to a concave or convex shape of the chromatic reflective unit). The surface-type defines, for example, a planar or curved viewable face of the chromatic reflective unit 1 which is essentially independent of the orientation of the reflective surface sections.

The herein disclosed non-coplanar orientation of the reflective surface sections results, however, to a deviation of their orientation with respect to that surface-type. In general, that deviation can be described using a central plane 17 and a reference plane 19 as introduced below.

In FIG. 4, central plane 17 is indicated. It is representative for the spatial orientation of the non-coplanar reflective surface sections. For example, central plane 17 may be the best fitting plane determined by, for example, the method of linear least squares. As is apparent in view of the reflective feature of chromatic reflective unit 1, central plane 17 has a diffusing layer side 17A facing essentially in the direction of potential incident light. The other side of central plane 17 is a non-illuminated side 17B (in general, non-illuminated side 17B is the side at which the reflective layer limits essentially the propagation of incident light).

Based on central plane 17, a reference plane 19 is selected that is coplanar with respect to a central plane 17 and that is displaced from central plane 17 at diffusing layer side 17A beyond anyone of the plurality of non-coplanar reflective surface sections 3'. Reference plane 19 shown in FIG. 4 is an exemplary plane fulfilling the above conditions. The surface feature of chromatic reflective unit 1 is given by the variation in a distance d between the various points on reflective surface sections 3' and reference plane 19. Exemplary minimum distances 21 for two positions (measured in normal direction to reference plane 19) are indicated in FIG. 4.

In FIG. 4, an exemplary variation in distance d along a straight measurement line in y-direction is schematically indicated as a distance graph 23. With increasing y-position, distance d decreases for reflective surface sections 3' (indicated as section 3' of distance graph 23).

In the saw-like cross-section of chromatic reflective unit 1 shown in FIG. 4, neighboring reflective surface sections 3' are connected by transition surface sections 25. Distance d increases in y-direction for those surface sections 25 as indicated by sections 25' of distance graph 23.

In distance graph 23, several local extrema 27 (local maxima or local minima) indicate the transition of increasing and decreasing sections. As shown, in FIG. 4 distance d increases and decreases at least twice along the measurement line in y-direction. Similarly, the non-coplanar surface configuration is characterized by more than three local extrema (excluding terminal points).

In other words, the shape-analysis of the non-coplanar surface sections with respect to a predefined direction may include the steps: estimating for the reflective surface a best fitting plane with, for example, a linear least squares method; selecting a second plane parallel to the best fitting plane such that the second plane does not intercept with the reflective surface; estimating a distance function of two variables, such as d(x, y), which defines the distance between a specific point (x, y) on the second plane and the intercept with the reflective surface along a straight line orthogonal to the second plane at the point (x, y) (in case of multiple intercepts with the reflective surface, selecting the shortest distance as the value of the distance function d (x, y)); and selecting a section r(q) from d(x, y) wherein the section is the intersection of the distance function d(x, y) with a given plane perpendicular to the second plane. The distance requirement is then that the distance in dependence of the variable q has more than three local extrema (excluding terminal points) for at least one given section r(q).

For completeness, for a panel shaped chromatic reflective unit 1 (planar surface type), the saw-tooth like distance d development may be essentially unchanged and repeat itself over the complete extent of the chromatic reflective unit 1, while for a curved surface type, the distance d development may approach or veer away towards the boarder of the chromatic reflective unit as will be apparent to the skilled person.

Various embodiments of chromatic reflective units 1 with respect to the configuration of the non-coplanar reflective surface sections and the chromatic diffusing layer are exemplary described in connection with FIGS. 5 to 7 for sandwich-type configurations.

Figure 5:
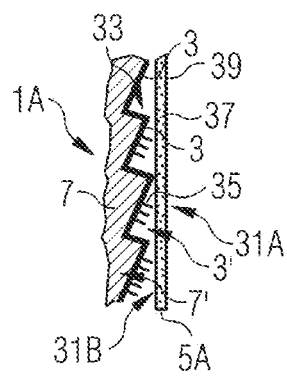
FIGS. 5 to 7 are schematic cross-sections of a sandwich-type configurations of chromatic reflective units.

In FIG. 5, an embodiment of a chromatic reflective unit 1A is shown that comprises a chromatic diffusing layer 5A with a planar front side 31A (or a front side surface extending essentially as the base shape of the chromatic reflective unit) and a respectively shaped back side 31B. Reflective surface sections 3' of reflective layer 3 are non-coplanar as described above. Accordingly, a gap volume 33 extends between planar back side 31B and reflective surface sections 3' that varies in thickness.

In the embodiment of FIG. 5, back side 31B of chromatic diffusing layer 5A extends parallel to front side 31A. Accordingly, chromatic diffusing layer 5A has a back side 31B provided at the side of reflective surface sections 3', while front side 31A will be illuminated by incident light 9 (see FIG. 3).

In the exemplary embodiment of FIG. 5, chromatic diffusing layer 5A is constant in thickness and gap volume 33 may comprise some (essentially transparent) filling such as air or some filling material (indicated by dashed line 35 for the three lower gap volumes 33) such as the material of a nanoparticles 37 embedding matrix 39. In the embodiment of FIG. 5, the number of nanoparticles per unit surface area is maintained constant in y-direction. Depending on the size, a refractive filling material may provide an additional chromatic dispersive effect that—depending on the configuration and viewing distance—may be acceptable.

In alternative embodiments, the chromatic diffusing layer may also extend into gap volume 33, thereby providing an inhomogeneous thickness and an in y-direction varying number of nanoparticles per unit surface area. This may also generate modulations in color that may in some configurations be acceptable, in particular in dependence of the shape of gap volume 33 and the viewing distance.

Similar to FIG. 3, reflective layer sections 3' of FIG. 5's embodiment may be provided on a side of a substrate 7 that is saw-like shaped in cross-section. Reflective layer 3 may be formed on—additionally to reflective layer sections 3'—the transition surfaces between reflective layer sections 3'. However, the transition surfaces do not need to be part of the reflective surface sections, in particular in applications having a preset observation direction, from which an observer cannot see the transition surfaces.

Figure 6:
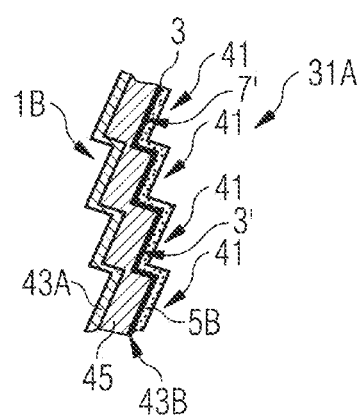

For illustrating a further sandwich-type embodiment, FIG. 6 shows a chromatic reflective unit 1B that comprises a plurality of chromatic diffusing layer sections 41 (of chromatic diffusing layer 5B) being respectively associated and applied on reflective surface sections 3' of the plurality of non-coplanar reflective surface sections.

As indicated in FIG. 6, a thickness of each chromatic diffusing layer section 41 is constant. Accordingly, a respective front side section of front side 31A is essentially oriented like the respective reflective surface section and front side 31A is shaped according to the shape of substrate 7. In FIG. 6's cross-sectional view, the front side sections and the reflective surface sections are exemplarily planar.

Like in the embodiment of FIG. 5, assuming homogeneous physical microscopic properties of chromatic diffusing layer 5B, a homogeneous scattering effect is given for the incident light.

With respect to the manufacturing of chromatic reflective unit 1B, the specific embodiment of FIG. 6 is based on a pair of metal layers 43A, 43B spaced apart by a polymer 45—acting as a support structure. Metal layer 43B forms the basis for the reflective layer sections 3'. The structure of FIG. 6 can be manufactured by deforming an initially planar sandwich structure comprising the metal layers 43A, 43B and polymer 45 in a manner that the required non-coplanar shape is given. Chromatic diffusing layer 5B may be applied before or after deformation.

Figure 7:
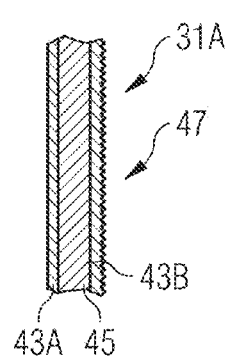

FIG. 7 shows an alternative embodiment of a chromatic reflective unit 1C. Similar to the embodiment of FIG. 6, the structure comprises—as a support structure—a sandwich of two metal layers 43A, 43B and a polymer 45 as an example of a core layer.

In contrast to the embodiment of FIG. 6, the embodiment of FIG. 7 does not deform the complete sandwich structure but instead imprints a desired surface structure on metal layer 43B. In some embodiments, metal layer 43B may provide the reflective feature, thus be the reflective layer. In other embodiments, a specific reflective layer may be provided on metal layer 43B. The chromatic diffusing layer may be applied before or after imprinting and is not explicitly referenced in FIG. 7. In general, imprinting may allow for a small sized structure in comparison of any mechanical bending such as underlying, for example, FIG. 6's embodiment.

In general, the reflective surface sections may have a lateral extent of at least 0.5 mm, e.g. at least 1 mm such as 5 mm, 10 mm, or more, and/or cover an area of at least 0.5 mm², e.g. at least 1 mm² such as 2 mm², 1 cm², or more.

Depending on the use, e.g. if the chromatic reflective unit will be illuminated from both sides, also first metal layer 43A may be imprinted and coated to provide the plurality of non-coplanar reflective surface sections.

In summary, sandwich-structures shown in FIGS. 5 to 7 comprise a sequence of surface sections, in particular formed on an illumination-sided stabilizing layer, that are inclined with respect to the base surface-shape of the chromatic reflective unit, and form the basis for the reflective surface section and the chromatic diffusing layer provided thereon.

As mentioned above, chromatic diffusing layer 5 may be a coating or film that has a thickness of, for example, about 0.2 mm or less such as 0.1 mm or less or even 0.05 mm or less. Moreover, the coating or film may be deposited onto the reflecting surface sections prior or after providing their respective non-coplanar shape.

For completeness, in addition to nanoparticles 37, larger light-scattering centers may be embedded within the chromatic diffusing layer or, for example, the filling material of gap volume 33. Those additional light-scattering centers may have an average size larger than Rayleigh-active nanoparticles 37, for example in the range of 1 µm or more such as larger than about 5 µm. The additional light-scattering centers may provide—in addition to the above discussed Rayleigh-like diffuse scattering by Rayleigh-active nanoparticles 37—a blurring effect that effects the specular reflected component to be deviated from the pure specular reflection in a forward "scattering" cone.

As will be apparent to the skilled person, an analogue blurring effect may be generated by providing micro-roughness on the chromatic diffusing layer, for example, on the illumination side and/or by providing the reflective surface, instead of with a perfectly glossy finishing, with a rough finishing (such as those available in commercial products such as some type of coil-coated high-reflective metal sheets) configured to provide diffusion of reflected light within a cone of about 3° or more such as 5° or more or even 10° or more.

Methods for applying the reflective layer and/or the chromatic diffusing layer include metal vacuum deposition, molecular beam epitaxy, plasma coding, spraying, inkjet methods, film splitting, or the like.

In some embodiments, a metal layer can be used as reflective layer such as an aluminum metal mirror foil with reflectivity larger than 95% or even larger than 98%.

Figure 8:
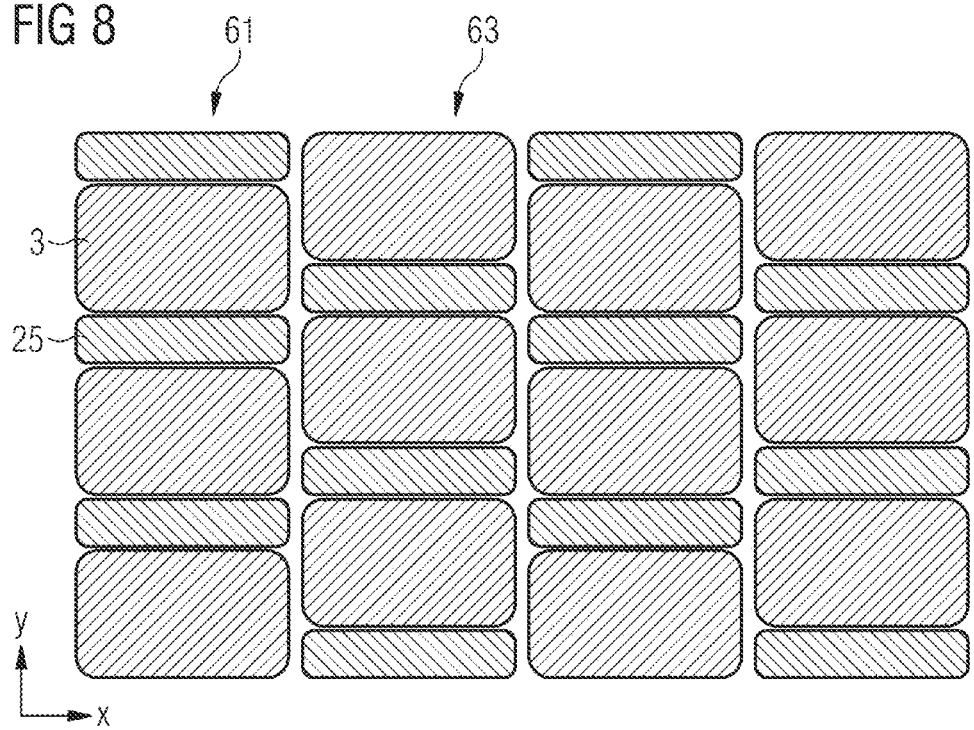
FIGS. 8 and 9 are schematic top views illustrating exemplary arrangements of a plurality of reflective surface sections.
Figure 9:
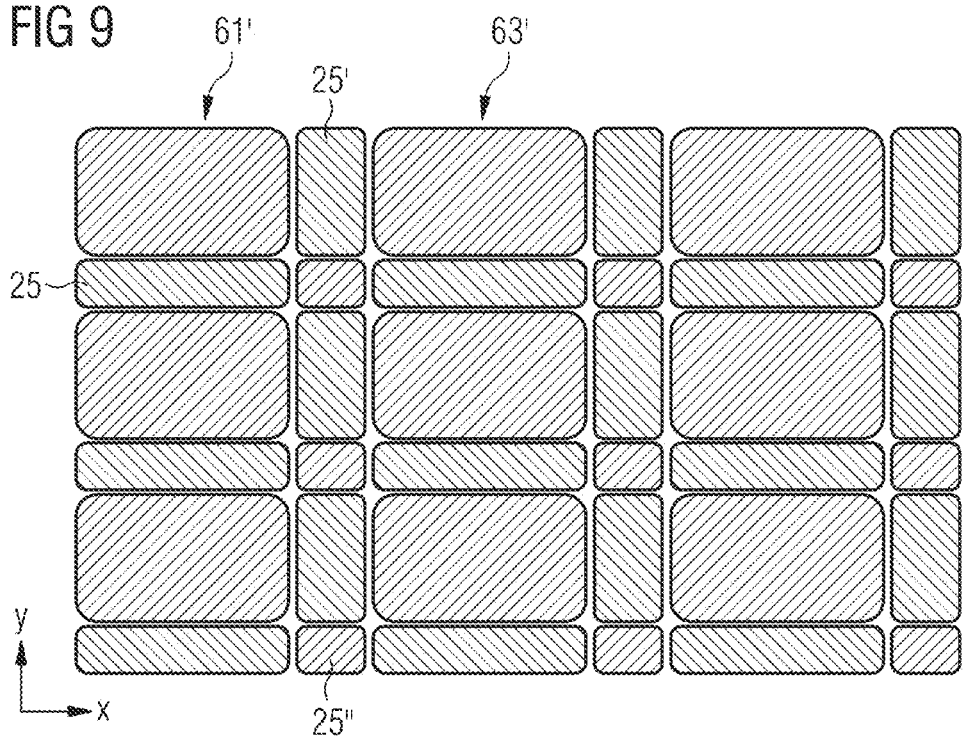

FIGS. 8 and 9 are schematic top views illustrating exemplary arrangements of a plurality of reflective surface sections. Specifically, FIG. 8 illustrates an embodiment for an imprinted surface structure that comprises sequences of reflective surface sections 3' that are separated by transition surface sections 25 in y-direction. In y-direction displaced reflective surface sections 3' form a first subgroup 61 of reflective surface sections that may have a first type of inclination. Shifted in x-direction, a second subgroup 63 of reflective surface sections 3' may provide a sequence having reflective surface sections with a different inclination. Shifted again in x-direction, there is a further subgroup of reflective surface sections 3' that extends in y-direction and may differ again in inclination or have one of the inclinations of the previous subgroups 61, 63.

Accordingly, the embodiment of FIG. 8 illustrates the possibility to form a mosaic-like structure with a variety of different subgroups of reflective surface sections having identical or different orientation in space.

The embodiment of FIG. 9 has additionally transition surfaces in between rows (subgroups, sequences) such as exemplary shown transition surface sections 25' and 25" between subgroup 61' and subgroup 63'. The additional transition surface sections may be caused by the respective manufacturing process and may contribute themselves to the scattering/reflection features, thereby, for example, supporting the breaking up of any reflected image.

In summary, referring to FIGS. 8 and 9, the plurality of reflective surface sections may be orientated with respect to the surface base shape to form a step-like sequence of reflective surface sections having identical and/or varying step shapes including identical and/or varying sizes, angles, and shapes—such as plane or curved shapes discussed below.

Figure 10:
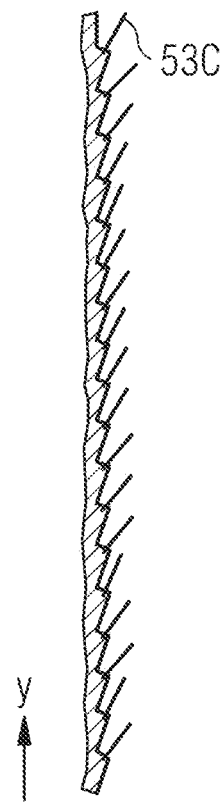
FIGS. 10 to 12 are schematic cross-sections of a chromatic reflective unit providing subgroups of reflective surface sections, a chromatic reflective unit providing randomized oriented planar surface sections, and a chromatic reflective unit providing randomized oriented concave surface sections, respectively.
Figure 11:
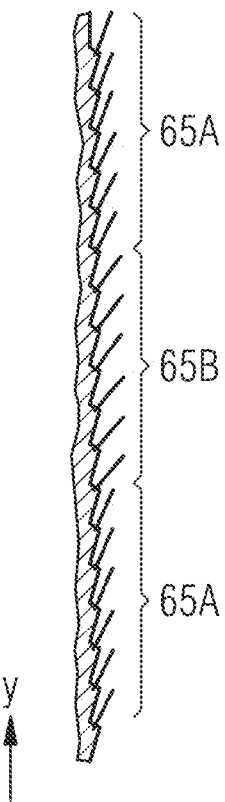
Figure 12:
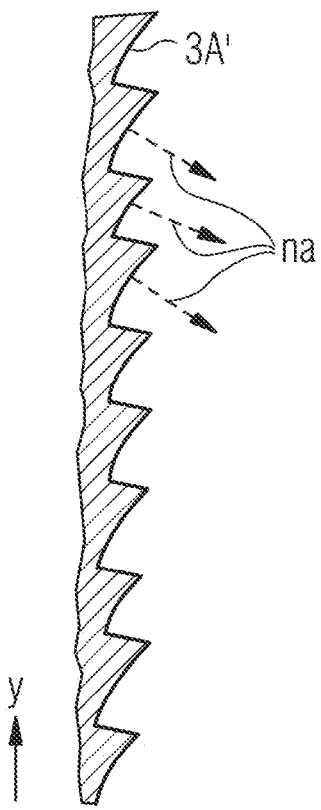

FIGS. 10 to 12 illustrate the flexibility that is available for orienting reflective surface structures for modular configurations and sandwich-type configurations.

For example, FIG. 10 illustrates an embodiment in which chromatic mirror units 53C are inclined with respect to y-direction in a random manner. The random orientation of the various chromatic mirror units 53C provides for a breaking of the mirrored image because an observer sees, for a specific viewing direction, various sections of the incident light.

A more regular configuration of chromatic mirror units is shown in FIG. 11, which includes alternating subgroups 65A, 65B in y-direction, each having a respective orientation/inclination. Thereby, configurations are possible that specifically link a viewing direction with two regions of the incident light. In illuminated configurations with essentially a single incident direction, this aspect allows to provide the sky-sun impression at various observer locations.

FIG. 12 illustrates a configuration in which a random-like orientation is combined with a concave configuration of the reflective surface sections 3A'. The embodiment combines the aspect of focusing (or alternatively defocusing) with the effect of randomness.

FIG. 12 illustrates further the concept of an associated (section) normal na for curved surface sections—in analogy to planar surface normals (which are considered to be an associated normal within the herein disclosed concepts). In principle, for an incident beam, also a curved surface will generate a reflected beam that can be associated with a main beam direction after the reflection. That main beam direction and incident beam direction define the associated normal. As shown in FIG. 12, also for a random-like orientations, the associated normal na are non-parallel. If the maintenance of some beam like behavior is intended, a range of possible directions into which the associated (section) normals na point may extend around a subgroup inclination angle. The subgroup inclination angle refers herein to those reflective surface sections that are contributing the visual perception and relates to the surface type of the chromatic reflective unit. The subgroup inclination angle may be in the range from, for example, about 2° to about 88°, in particular in the range from about 5° to about 60° such as in the range from about 10° to about 30°. In general, associated normals na are inclined with respect to a unit normal that is associated with a respective portion of a surface-type of the chromatic reflective unit by inclination angles. For a given inclination direction (e.g. x or y direction or any other direction relating to the surface type), inclination angles of the associated normal na may be within an angular range up to, for example, about 30° with respect to the subgroup orientation direction such as within an angular range of up to about 20°, 10°, or 5°. In some embodiments, inclination angles of the associated normal na may not be limited with respect to the subgroup orientation direction, thereby allowing implementations for a larger potential incident angles of, for example, an incident light beam emitted by a light source.

For example, the inclination angles associated with respective chromatic reflective sections in FIGS. 10 to 12 may be in the range from about 2° to about 80° such as in particular in the range from about 10° to about 40°.

Moreover, the above discussed configuration illustrate the possibility to provide—with respect to a single one of the respective surface sections or with respect to a plurality of reflective surface sections—a constant or varying scattering characteristic, a constant or varying nanoparticle distribution, and/or a constant or varying inclination angle of the reflective surface sections. Those aspects affect the chromatic feature of the chromatic reflective units for specific viewing directions.

In the following, exemplary application of chromatic reflective units are described, in particular with respect to outdoor concepts and indoor concepts. In general, the herein described chromatic reflective units may extend over areas of several square centimeter (e.g. for illumination configurations), up to several 100 square centimeter, up to even several square meter (e.g. for facade configurations).

Figure 13:
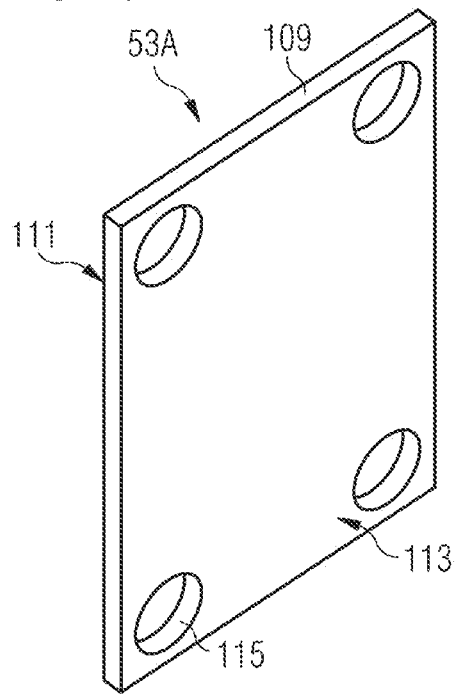
FIG. 13 is a schematic illustration of a glass panel based mirror unit.
Figure 14:
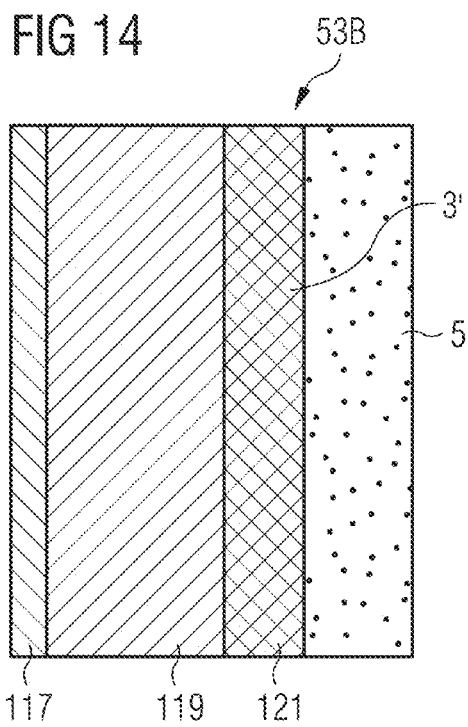
FIG. 14 is a schematic illustration of a sandwich based mirror unit.

FIGS. 13 and 14 show exemplary embodiments of panel shaped chromatic mirror units 53 as they can be used in chromatic reflective units such as shown in FIG. 1.

FIG. 13 illustrates a glass panel based chromatic mirror unit 53C. The glass panel 109, for example a safety glass panel, forms a part of the support structure of a chromatic reflective unit and has a reflective layer 111 applied on one side and a chromatic diffusing layer 113 applied on the other side. The mirror unit may comprise, for example, through holes 115 for attaching the mirror unit to a grid configured for mounting mirror unit 53 under the desired inclination.

In alternative embodiments, glass panel 109 may be replaced by transparent panels made of, for example, a polymeric, e.g. an acrylic, polycarbonate, PVC or the like material. Respective non glass materials may simplify the mounting and reduce the weight of chromatic mirror unit 53C.

In FIG. 14, a further alternative configuration of a sandwich structure based mirror unit 53D is shown. Mirror unit 53D comprises a mount-sided stabilizing layer 117, a core layer 119, and an illumination-sided stabilizing layer 121 thereby forming a composite panel such as an aluminum composite panel that forms a part of the support structure of a chromatic reflective unit. The reflective layer sections 3' may be provided by the illumination-sided stabilizing layer itself (e.g. by an aluminum layer) or they may be applied separately thereon by a reflective layer. Chromatic diffusing layer 5 is then applied onto illumination-sided stabilizing layer 121 or that reflective layer.

An active illumination configuration is described in the following in connection with FIG. 15.

Figure 15:
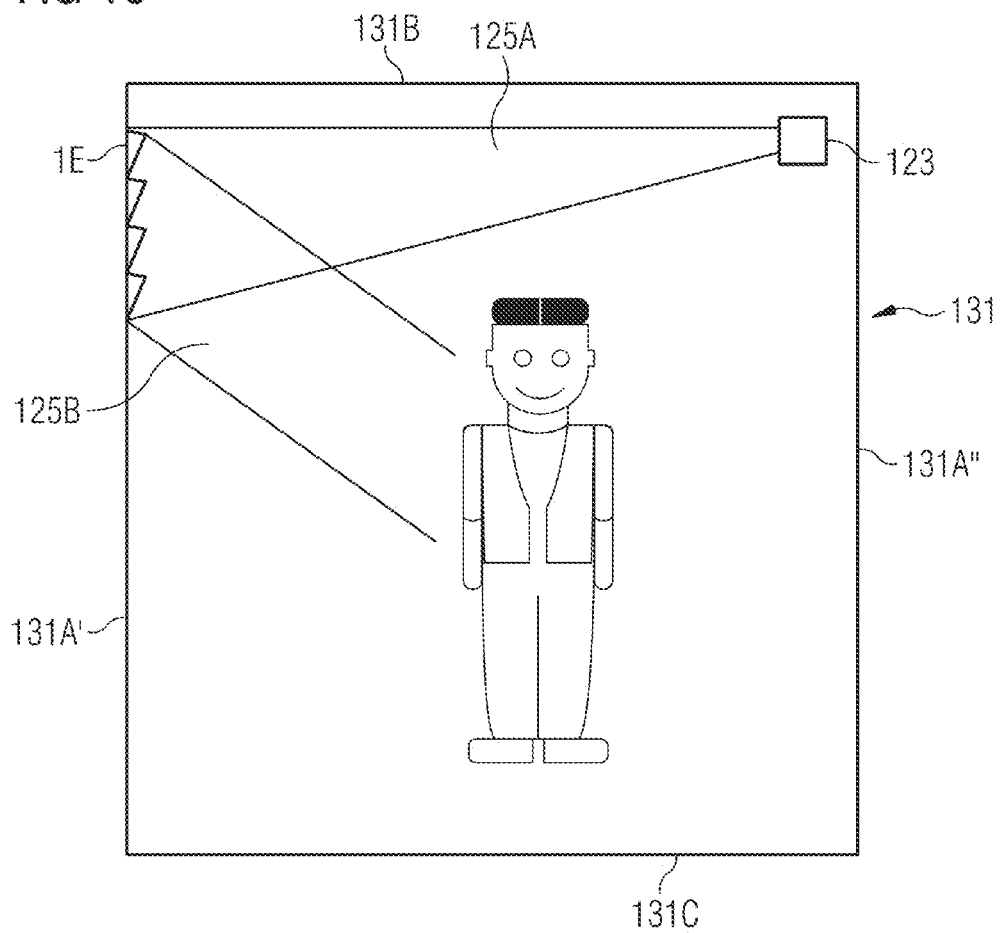
FIG. 15 is a schematic illustration of an indoor illumination concept based on a chromatic reflective unit.

FIG. 15 illustrates an exemplary indoor configuration for an illumination application of the chromatic reflective units described herein. Specifically, in a room or an elevator 131 delimited by walls 131A', 131A", a ceiling 131B, and a floor 131C, a chromatic reflective unit 1E is mounted to wall 131A'. Projector 123 is mounted to ceiling 131B or close to ceiling 131B, for example, at wall 131A" opposing chromatic reflective unit 1E and emits light beam 125A onto chromatic reflective unit 1E. Reflected light beam 125B falls onto floor 131C.

A person within room 131, when looking at chromatic reflective unit 1E from the outside of reflected light beam 125B, sees the blueish appearing chromatic reflective unit 1E.

The person, when being within reflected light beam 125B, sees the reflected light.

As described herein, the chromatic diffusing layer can produce a chromatic separation (in terms of correlated color temperature CCT) of the regular (specular) reflected light of reflected light beam 125B from the scattered diffuse light. Specifically, the correlated color temperatures of the diffuse light will be larger than the correlated color temperature of the specular reflected light, for example by a factor 1.2 or 1.1 or the like. Depending on, for example, the color, shape, and homogeneity of the light emitted from projector 123, a sunlight imitating lighting system can be generated as described in the initially introduced applications.

In general, for non-coplanar surface sections, multiple "sun" reflections on chromatic reflective unit 1 may occur that each surrounded by a blue appearance due to diffuse scattered light. They may appear to an observer, for example, as reflections of the sun light on an irregular surface such as reflections of sun light on the waves on a lake.

FIG. 16 does exemplarily show embodiments for such a sun-like blinking perception for a chromatic reflective unit having non-coplanar reflective surface sections. In FIG. 16(a), an observer looks at a chromatic reflective unit 401 that is illuminated by a light source 402. Specifically, light source 402 emits a light beam 403 having, for example, an angular divergence in the range up to 80°, such as in a range up to 60°, or a range up to 40° or less.

Chromatic reflective unit 401 may be configured so that the non-coplanar reflective sections 3' are connected and form a continuous coarse grain surface 410. Exemplary cut-views of coarse grain surface 410 are shown in FIGS. 16(b) and 16(c) and exemplary top views are shown in FIGS. 16(d) to 16(f).

As further shown in FIG. 16(a), coarse grain surface 410 is essentially completely illuminated by light beam 403 such that the complete coarse grain surface 410 can be considered a source of Rayleigh-like scattered light B (considered to provide a blue color for a sky-like impression) as indicated for three points P1, P2, and P3 on coarse grain surface 410. Depending on the respective orientation of coarse grain surface 410, the observer may perceive, however, primarily a strong specularly reflected portion Y1, Y3 of light beam 403, e.g. indicated for points P1 and P3. For point P2, the surface is inclined such that the respective portion Y2 of light beam 403 is reflected towards the ground in front of the observer such that the observer only perceives scattered light contributions B from point P2.

The extent of bright light associated with an area on coarse grain surface 410 depends on the extent of the surface that fulfills the specular reflective conditions (in general at least subgroups of non-coplanar surface sections are formed by the coarse grain structure, in particular the mosaic-like surface structures).

Assuming the requirement that the observer can distinguish isolated bright points from the surrounding (the surrounding not contributing to the perceived specular reflection), the required size will be apparent to the skilled person. For example, it depends on the geometry of the illumination system, in particular the distance of the observer to coarse grain surface 410. Depending on the expected distance of the observer to the chromatic reflective unit, surface sections 3' may have the size of several square millimeters or few square centimeters.

For comparison of the reflective feature of coarse grain surface 410 with a planar chromatic reflective surface, for each point P1 to P3, reflected beams n1' to n3' are indicated as dashed lines in FIG. 16(a).

Specifically, the embodiments of FIG. 16 may provide the vision of glittering light peaks (portions Y1, . . . ) based on directed light beam 403, where the glittering light peaks may alternate with sky-like fragments (scattered light B). Chromatic reflective unit 401 may be configured so that non-coplanar reflective surface sections 3' are connected and form a continuous surface.

FIG. 16(b) illustrates as a first exemplary embodiment a smooth surface providing reflective surface sections 3' that essentially fulfill similar specular reflection conditions. Exemplarily, a light beam portion 403' is indicated that is specularly reflected by a reflective surface section to form an illuminating beam portion 403A'. A respective associated normal na is illustrated for that reflective surface section.

FIG. 16(c) illustrates as a second exemplary embodiment in which the smooth surface of FIG. 16(b) is composed of essentially planar facets. The second embodiment again provides a reflective surface sections 3' that provides specular reflection conditions illustrated by an associated normal na, which in this case corresponds to the normal of the planar facet.

In general, coarse grain surface 410, specifically the continuous reflective surface, may be made of a multitude of planar or quasi-planar surface sections of various shapes and extends. The shapes and extends may be configured with higher or lower degree of regularity, order, and/or periodicity such as with a limited number of types of surface sections, shapes, or inclinations.

The continuous reflective surface may be completely (as shown in FIGS. 16(b) and 16(c)) or partially coated with a chromatic diffusing layer 5 to provide (blue) scattering at angles of observation for each single section, i.e. at angles different from the specular reflection direction of light beam 403, which is the main illumination contributions, and thus away from yellow bright luminance in the specular reflection direction. This aspect of—in 2D—mosaic like segmentation of specular reflectivity conditions in combination with the nanoparticle based Rayleigh-like scattering may provide the appearance of many glittering light peaks (beam portions Y)—which will be perceived similar to the case of sun reflected in the water—together with scattered light regions, which may be perceived as sky-like fragments. It is noted that this effect may even be increased when the reflective surface sections are configured in a partly irregular arrangement, with many different shapes, sizes and orientations and with different rays of curvatures, even the limit case of a non-regular and non-periodic sinusoidal (wave-like) profile may provide the desired effect.

FIGS. 16(d) to (f) illustrate exemplary mosaic-like surface structures 412 of continuous coarse grain surfaces 410. The plurality of mosaic-like surface structures 412 are configured to form a faceted surface and provide a plurality of facet-like surface sections for interacting with light beam 403. A correlation area of mosaic-like surface structures 412 is selected to provide for a fragmentation of the vision of the emitting area of light source 402 when seen along an optical path including continuous coarse grain surface 410 from the target illumination/observer area. The plurality of surface sections are configured to redirect incident light beam portions such that the light beam downstream the continuous coarse grain surface 410 is broadened in size. Thereby, the illuminance values on the target illumination/observer area are reduced, while redirected light beam portions exhibit local luminous peaks with a luminance comparable to the luminance of the emitting surface of light source 402.

The correlation area of the mosaic-like surface structures corresponds essentially to the average transversal size of the single mosaic-like surface structure such as one complete surface oscillation (e.g. from a deepest point to a highest point to the next deepest point on the surface). Moreover, the correlation area is essentially comparable in size to the size of the (light interacting) surface section. Accordingly, to be visually resolvable, it is in the range from, for example, about 0.5 mm to 1 m. In principle, the reflective surface section is a fraction of the correlation/transversal size (for example, half in a symmetric geometric shape or even a larger percentage depending on the inclination of the facet structure). As will be understood by the skilled person, "transversal" in this context refers to the surface-type, e.g. a plane parallel to the central plane. Correlation is a defined mathematical term (here the 2D-correlation). It is noted that in case of a non-planar surface, correlation scales larger than the section may appear (e.g. if the unit is curved or itself sinusoidal).

Referring to FIG. 16(d), continuous coarse grain surface 410 comprises several types of pyramids that are arranged to completely cover the surface in a regular arrangement. Thereby, also a set of regularly distributed and identically oriented reflective surface sections are formed.

In contrast, continuous coarse grain surface 410 shown in FIG. 16(e) comprises many more types of different geometrical shapes including inter alia pyramid-like shapes and wedge-like shapes. The geometrical shapes are mosaic-like arranged to completely cover the surface in an irregular arrangement. Thereby, also a set of irregularly distributed and differently oriented reflective surface sections are formed that in addition vary in size.

Similarly to the embodiment shown in FIG. 16(e), continuous coarse grain surface 410 of FIG. 16(f) comprises various types of different shapes that are in general related to geometrical shapes but may—for example due to the processing procedure—to some extend rounded. As can be seen, the faceted structure is made of curved facets that are located either directly next to each other or are separated by some planar transition surface section. The structures have, for example, again pyramid-like shapes and wedge-like shapes. In addition, the height of the mosaic-like structure may vary more than in FIG. 35(e). Thereby, again a set of irregularly distributed and differently oriented and differently sized reflective surface sections are formed.

As a general indication, the x (or y) size of the sections, the x (or y) average size of the patches, the x (or y) local periodicity of the oscillating surface or, in general the x (or y) support structure size to support on average a single oscillation of the reflective surface (one local maxima and one local minima of the distance to a reference plane) may be configured so that, for an observer standing in the installation ambient, the individual surface sections are optically resolvable by eye in order to appreciate color and brightness variations. For indoor applications reflective sections may extend about or larger than 1 mm, such as few centimeters or even larger than 0.2 m. For outdoor applications, the surface sections may be larger than 5 mm, such as 0.3 m, or even larger than 0.5 m.

When interposed between a light source (this can be a specific light projector or also Sun or a distribution of luminance with some peaks etc.) and the observer, the chromatic reflective units based on mosaic-like surface structures provide in appearance a fragmentation (such as a partition-chopping-splitting) of the source in many smaller perceived sources with comparable (in general not significantly reduced) luminance but with significant smaller size (angular size, for a fixed observer distance from the source).

Those smaller luminance peaks are obviously distributed over a large angular range with respect to the original source angular shape.

This produces in terms of visual appearance the same perception of brightness produced by the original source (local peaks preserve the brightness level of the source) provided that the optical structures can be resolved by the observer's eye (e.g. light peaks essentially do not mix up), thereby providing, for example, of the sun being reflected in the water—together with scattered light regions, which may be perceived as sky-like fragments.

This appearance is specific and stands in contrast with a fine-structured diffuser (that would be perceived when the optical structures are not resolvable) as in that case the luminance is averaged and the high-level peaks are smoothed and significantly reduced as a result.

Referring again to FIG. 16(a), in projection the illustrated illumination system produces a broadening and a smoothing of the projected light spot obtainable from the light source without the coarse-grain frost. In other words, the in connection with FIG. 16 disclosed embodiment introduce a type of a non-absorbing Rayleigh-like scattering coarse-frost unit based on non-coplanar surface sections.

The configuration combines the chopping of luminance into small regions with diffusing the blue component as a Rayleigh diffuser.

This allows to obtain a smearing and a broadening of the direct light spot by a fragmentation of the emitting area of the source, yet each being perceived as the "sun" in terms of color and luminance though chopped in smaller sources, while the sky color may be preserved.

In some embodiments, continuous coarse grain surface 410 may be coated with a chromatic diffusing layer as disclosed herein.

Although exemplary embodiments of this invention have been described herein, embodiments may be combined in one illumination system such as combining on a chromatic reflective unit random and plan-parallel reflective surface sections.

The inventors have further realized that a combination of a reflective panel with the Rayleigh-like scattering has also advantages on lighting systems in general. An exemplary lighting system will be described in connection with FIG. 17 below, wherein the lighting system is based on a large panel structure not limited to reflective layers as described before (those being based on a plurality of non-coplanar surface sections and formation of a plurality of non-coplanar reflective surface sections).

Several advantages were realized for the herein disclosed parameter ranges that support in particular suppression of background reflections. Before describing the exemplary lighting system embodiment, the aspects of the nanoparticle layer are summarized for the as high concentration Rayleigh-like scattering embodiment in the following. It is noted again that those aspects do apply to structures disclosed before (forming inter alia non-coplanar reflective surface sections) as well as e.g. panel structures and coatings. For example, the skilled reader will further appreciate that some aspects discussed above for the non-coplanar designs such as inclination aspects of mirror units to use ground as darker background, aspects relating to birds, aspects relating to color drifts may not be relevant under certain boundary conditions.

In application PCT/EP2015/001454, entitled "CHROMATIC REFLECTIVE UNIT", filed on 15 Jul. 2015 by the applicants, corresponding to the first part of this application, a set of intervals is disclosed for the effective areal density N of nanoparticles for a nanoparticle based chromatic mirror unit.

Such areal density N may be defined as the number of nanoparticles per square meter, i.e. the number of nanoparticles within a volume element delimited by a portion of the surface of the nanoparticle-loaded layer having an area of 1 $m^2$ and corresponds to the value obtained by multiplying the number density of nanoparticle by the thickness of the layer.

In the first part of this application, the chromatic mirror unit was also characterized from a macroscopic point of view by the use of the monochromatic normalized specular reflectance R(λ), defined as the ratio between the specular reflectance of the chromatic reflective unit and the specular reflectance of a reference sample identical to the chromatic reflective unit except for the fact that the diffusing layer does not contain the nanoparticles having a size in the range from 10 nm to 240 nm, i.e. the nanoparticles which are responsible of preferentially diffusing the short wavelengths of the impinging radiation.

Those parameters stand in relation to WO2009/156348 A1 that discloses for transmission concept a solid optical chromatic diffuser use nanoparticle-based Rayleigh-like scattering and in particular introduces the concept of the monochromatic normalized collinear transmittance T(λ) to define the desired Rayleigh-like feature. R(λ) and T(λ) are quantities describing the behavior of chromatic diffusers in reflection and transmission geometries, respectively. As in reflection geometry, by assuming a perfectly reflective layer for the mirror layer, the light is crossing twice the diffusing layer, for the same concentration N holds the relation: $R=T^2$.

Further intervals relate to the above disclosed values for R(450 nm) in the range from 0.01 to 0.16, for example from 0.04 to 0.09 with corresponding areal densities:

$$N \geq N_{min} = \frac{3.69 \times 10^{-28}}{D^6} \left|\frac{m^2+2}{m^2-1}\right|^2 \, [\text{meters}^{-2}],$$

(D given in [meters]; for m and D definitions see equivalently PCT/EP2015/001454 or WO2009/156348 A1) and $$N \leq N_{max} = \frac{9.27 \times 10^{-28}}{D^6} \left|\frac{m^2+2}{m^2-1}\right|^2 \, [\text{meters}^{-2}];$$

for example, $$N \geq N_{min} = \frac{4.85 \times 10^{-28}}{D^6} \left|\frac{m^2+2}{m^2-1}\right|^2 \, [\text{meters}^{-2}]$$

and $$N \leq N_{max} = \frac{6.48 \times 10^{-28}}{D^6} \left|\frac{m^2+2}{m^2-1}\right|^2 \, [\text{meters}^{-2}].$$

Moreover, the monochromatic normalized specular reflectance at wavelength 450 nm could be further reduced by increasing the areal density of nanoparticles. This decrease in R has the following advantages:

1—Increase of the diffused light (blue haze) of the diffusing layer in order to increase the luminance of the scattered light; this higher luminance gets rid of background scene perception, to be used especially in presence of high level of illumination of the room (also related to different/additional light sources).
2—Decrease of the correlated color temperature (CCT) of the sun like at sunset, i.e. higher levels of chromatic diffusion make the sun more yellow/red, without spoiling the color of the sky.
3—Obtain a sunset-warm sun, i.e. make the sun color shift toward low color temperatures, while at the same time keeping a high efficiency by the use of the mirror layer which redirects the otherwise lost component of back-scattered light. The presence of the mirror layer enables to increase the concentration enormously without losing the efficiency.

In order to achieve the above stated goals, R(450 nm) can be in the range from 0.003 to 0.01, for example from 0.005 to 0.009. In terms of concentrations, in view of the above considerations, the corresponding N would be:

$$N > N_{min} = \frac{9.27 \times 10^{-28}}{D^6} \left|\frac{m^2+2}{m^2-1}\right|^2 \, [\text{meters}^{-2}],$$

(D given in [meters]) and $$N \leq N_{max} = \frac{1.17 \times 10^{-27}}{D^6} \left|\frac{m^2+2}{m^2-1}\right|^2 \, [\text{meters}^{-2}];$$

for example, $$N \geq N_{min} = \frac{9.48 \times 10^{-28}}{D^6} \left|\frac{m^2+2}{m^2-1}\right|^2 \, [\text{meters}^{-2}]$$

and $$N \leq N_{max} = \frac{1.07 \times 10^{-27}}{D^6} \left|\frac{m^2+2}{m^2-1}\right|^2 \, [\text{meters}^{-2}].$$

Additional ranges that are applicable to achieve desired effects can be derived from the table below listing the respective numerical factors of the above equations. Those factors, each may be applied as upper or lower limit, including that value or excluding that value respectively:

| R(450 nm) | Factor (e.g. for Nmin) | Factor (e.g. for Nmax) |
|---|---|---|
| 0.01 | | 9.27e-28 (1.04e-27) |
| 0.16 | 3.69e-28 (4.14e-28) | |
| 0.04 | | 6.48e-28 (7.27e-28) |
| 0.09 | 4.85e-28 (5.44e-28) | |
| 0.003 | | 1.17e-27 (1.31e-27) |
| 0.01 | 9.27e-28 (1.04e-27) | |
| 0.005 | | 1.07e-27 (1.20e-27) |
| 0.009 | 9.48e-28 (1.06e-27) | |
| 0.008 | 9.72e-28 (1.09e-27) | |

Referring to FIG. 17, a lighting system 501 is illustrated schematically in a cut view for illuminating, for example, an indoor room.

Lighting system 501 comprises a light source 502, configured to emit light in an emission solid angle to form a light beam 503 (in FIG. 1 delimited by dashed lines 513) propagating along a main light beam direction 504 (also referred to as main beam axis). Generally, light source 502 can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

To reduce the dimension of illumination system 501, the optical systems downstream of the respective light emitter may include an optical system such as folding optics. Lighting system 501 further includes a chromatic reflector unit 506 that couples the light originating from light source 502 to a region to be lit up. In general, reflector unit 506 comprises a reflective structure 508 providing a reflective surface 508A and chromatic panel structure 510.

Reflective unit 506 may further comprise a support structure (such as frame 514). The support structure may comprises a supporting structure made of glass, a sandwich structure, PMMA, a metal such as aluminum having applied thereon and/or integrated therein the reflective layer 508 and/or the chromatic diffusing layer 510, and wherein in particular the sandwich structure is an aluminum or steel composite panel having a mount-sided stabilizing layer, an illumination-sided stabilizing layer, and a core layer therebetween, wherein the reflective layer is provided on or integrated into the illumination-sided stabilizing layer and the chromatic diffusing layer is applied onto the reflective layer or onto the illumination-sided stabilizing layer. Further embodiments of underlying structures are disclosed, for example, in the PCT application entitled "STRATIFIED PANEL STRUCTURE FOR SUN-SKY-IMITATING LIGHTING SYSTEMS", filed on 19 Nov. 2015 by the applicants, the content of which is incorporated herein by reference. Respective aspects of those stratified panels would be then adapted in line with the present disclosure.

Reflective surface 508A is generally any type of optical acting interface that reflects light having passed through chromatic panel structure 510. For example, reflective surface 508A may be a surface of an aluminum layer or an interface between components, such as a reflective coating. Due to reflective surface 058A, light of light beam 503 being incident on reflective surface 508A is redirected to pass again through chromatic panel structure 510, thereafter forming an illuminating light beam 503A (delimited by dash-dash-dotted lines 507A). In FIG. 36, a range 507 of sun-observer locations is illustrated, where it is referred in the wording "sun-observer locations" exemplarily to the "sun" because an especially impressive type of embodiments of lighting system 501 relates to sun-like illumination. Illuminating light beam 503A is, thus, directed in the to-be illuminated region and comprises directed light (herein also referred to as directed (light) component of the lighting system).

Chromatic panel structure 510 is generally configured for emitting diffuse light (later also referred to as diffuse (light) component of the illumination system) at a first color, e.g. in case of a sky imitation a bluish sky color, extends in front of reflective surface 508A, and comprises a visible front area section 510A that an observer can see when looking at reflector unit 506. In the exemplary embodiment of FIG. 36, a frame-like area 514A of a frame structure 514 extends next to and surrounding visible front area section 510A.

For example, the first color and the second color may be separated in the CIE 1976 (u',v') color space by, at least 0.008 such as at least 0.01, 0.025, or 0.04, where the color difference Δu'v' is defined as the Euclidean distance in the u'v' color space. In particular for sun-imitation configurations, the illuminating light beam CCT of the second color may be close to the Planckian locus (e.g. in the range from 800 K to 6 500 K). In some embodiments the second color may correspond to u'v' points with a maximum distance from the Planckian locus of e.g. 0.06. In other words, a distance from the Planckian locus is, for example in the range from 800 K to 6500 K, given by Δu'v'≤0.060.

As it is apparent to the skilled person, depending on the specific interaction of chromatic panel structure 510 with light beam 503, the color and/or CCT of light beam 503 and illuminating light beam 503A may be essentially identical or may differ. Depending from the type of nanoparticles and their concentration, the CCT difference may be, for example, at least 300 K or even 1 000 K or more.

Looking from within range 507 onto reflector unit 506, an observer may have an optical perception as schematically indicated in FIG. 36 within range 507. The optical perception essentially depends on reflector unit 506 and the light coming therefrom as illustrated by dash-dotted lines 507B being specific for the respective observer position. Specifically, lighting system 501 is configured such that light of significant intensity incident within range 507 of sun-observer locations originates from chromatic panel structure 510. The light of significant intensity comprises light of light beam 503A (originating from light source 502 and being light of light beam 503 redirected by reflector unit 506), and diffuse light originating from visible front area section 510A. In addition, the optical perception will—for the embodiment of FIG. 17—comprise a, for example dark colored, frame-like area 518 around visible front area section 510A.

In line with the optical perception illustrated in FIG. 17, the observer, when looking from within range 507 of sun-observer locations onto reflector unit 506, will see a large area 516 corresponding to visible front area section 510A based on the homogenously emitted diffuse light at the first color. Large area 516 will be surrounded by frame-like area 518. In addition, the observer will see a sun-like spot 519 at the second color caused by a reflected (directed non-diffuse) component of the light of light source 502, specifically of illuminating light beam 503A. (forward scattering effects or coarse grain effects of the light system are neglected for the illustration in connection with FIG. 36. However, those features may additionally be provided and affect, for example, the sun appearance.

Nanoparticle-based Rayleigh-like diffusing material used in the chromatic panel structure 510 may comprise a solid matrix of a first material (e.g. resins or adhesive polymer having excellent optical transparency), wherein nanoparticles of a second material (organic or inorganic nanoparticles such as $ZnO$, $TiO_2$, $SiO_2$, $Al_2O_3$ and similar) are dispersed. The refractive indexes of the two materials are different, and this mismatch on the refractive index on the nano-scale is responsible of the Rayleigh-like scattering phenomenon. The absorption of the first and the second material in the visible wavelength range can be considered negligible. Moreover, chromatic panel structure 510 may be uniform, in the sense that, given any point of the chromatic stratified panel, the physical characteristics of the panel in that point does not depend on the position of that point. The nanoparticles may be monodisperse or polydisperse, they may be spherically shaped or shaped otherwise. In any case the effective diameter d of the nanoparticles falls within the range [5 nm-350 nm], such as [10 nm-250 nm], or even [40 nm-180 nm], or [60 nm-150 nm], where the effective diameter d is the diameter of the equivalent spherical particle, namely the effective diameter spherical particle having similar scattering properties as the aforementioned nanoparticles.

Combining the herein disclosed features of the nanoparticle-based Rayleigh-like diffusing coating with the structural features disclosed herein may allow addressing one or more aspects of the prior art.

Summarizing, a light beam passing through a diffusive layer will generate scattered light and transmitted light. The coating features can modify both the spectral properties and the intensity distribution of the transmitted light. In particular the morphology of the layer (i.e. flatness, smoothness or orange peel) may give rise to a phase variation, which implies a modulation of the intensity distribution of the transmitted light. For the application of sun-sky-imitation, the uniformity in the transmission of an illumination profile is an important feature.

Therefore, it was realized that, to maintain the uniformity, the chromatic diffusing layer may have, for example, a thickness variation lower than 40%, for example 30%, such as 10% over lateral circular areas with diameter smaller than 20 cm, for example smaller than 10 cm, such as 3 cm. It is noted that the diameter depends on the type of installation, in particular the expected distance from an observer the chromatic diffusing panel.

Similarly, it was realized that the chromatic diffusing layer may have a number of nanoparticles per unit area of the chromatic diffusing layer averaged over lateral circular areas with diameter of 2 mm, that does not vary more than 20%, for example not more than 10%, such as 5%, among lateral circular areas within every region having a diameter of 10 cm on at least 80% of the surface of the chromatic reflective unit.

In the following, further aspects of the herein disclosed concepts are summarized:

Aspects A

1. A chromatic reflective unit (1) comprising:
   a support structure (7) comprising a plurality of non-coplanar surface sections (7'),
   a reflective layer (3) formed on the plurality of non-coplanar surface sections (7'), thereby forming a plurality of non-coplanar reflective surface sections (3'), respectively associated with one of the plurality of non-coplanar surface sections (7'), and
   a chromatic diffusing layer (5) having a back side provided at the reflective surface sections (3') and a front side for being illuminated by incident light (9), wherein the chromatic diffusing layer (5) comprises a plurality of nanoparticles (37) embedded in a matrix (39), and is configured to provide for a specular reflectance that is larger in the red than in the blue and for a diffuse reflectance that is larger in the blue than in the red.

2. A chromatic reflective unit (1) comprising:
   a support structure (7) configured as a chromatic diffusing layer (5) having a back side comprising a plurality of non-coplanar surface sections (7') and a front side for being illuminated by incident light (9), wherein the chromatic diffusing layer (5) comprises a plurality of nanoparticles (37) embedded in a matrix (39), and is configured to provide for a specular reflectance that is larger in the red than in the blue and for a diffuse reflectance that is larger in the blue than in the red; and
   a reflective layer (3) formed on the plurality of non-coplanar surface sections (7') of the back side, thereby forming a plurality of non-coplanar reflective surface sections (3'), respectively associated with one of the plurality of non-coplanar surface sections (7').

3. The chromatic reflective unit (1) of any one of the preceding aspects, wherein the reflective layer (3) continuously extends on the non-coplanar surface sections (7') of the substrate structure (7), and is in particular directly applied on and structurally directly connected to the non-coplanar surface sections (7'); and/or
   wherein the reflective layer (3) is a continuous metal layer on the non-coplanar surface sections (7'); and/or
   wherein the reflective layer (3) has a thickness providing for a reflectivity of at least 65% or even at least 75% or even at least 85% such as 90% for light having passed through the chromatic diffusing layer (5); and/or
   wherein the reflective surface sections (3') have a lateral extent of at least 0.5 mm, e.g. at least 1 mm such as 5 mm, 10 mm, or more, and/or an area of at least 0.5 $mm^2$, e.g. at least 1 $mm^2$ such as 2 $mm^2$, 1 $cm^2$, or more; and/or
   wherein the chromatic diffusing layer (5) has a thickness of 1 mm to 2 mm or a thickness that is less than the lateral extent such as less than 50% of the lateral extent, e.g. less than 0.5 mm such as in the range of about 0.1 mm; and/or
   wherein the reflective layer (3) is formed by a surface portion of the support structure (7).

4. The chromatic reflective unit (1) of any one of the preceding aspects, wherein the reflective surface sections (3') of at least a subgroup (61, 63) of the plurality of non-coplanar reflective surface sections form a sequence of reflective surface sections (3') having essentially an identical orientation in space and in particular an identical shape, and/or
   wherein the reflective surface sections (3') of at least a subgroup (61, 63) of the plurality of non-coplanar reflective surface sections are distributed uniformly with respect to each other, and/or
   wherein the reflective surface sections (3') of at least a subgroup (61, 63) of the plurality of reflective surface sections are planar or curved and are in particular oriented essentially identical in space such as parallel for planar reflective surface sections (3').

5. The chromatic reflective unit (1) of any one of the preceding aspects, wherein the reflective surface sections (3') of at least a subgroup (61, 63) of the plurality of reflective surface sections are characterized by a reflective surface section normal (55, na) wherein the shape is in particular planar or curved such as convex or concave, and the reflective surface section normal (55, na) is inclined with respect to a local unit normal (51) that is associated with a respective portion of a surface-type of the chromatic reflective unit (1), and
   wherein the reflective surface section normal (55, na) is in particular inclined with respect to the local unit normal (51) by an angle in the range from about T to about 88°, in particular in the range from about 5° to about 60° such as in the range from about 10° to about 30°.

6. The chromatic reflective unit (1) of any one of the preceding aspects, further being configured as a surface-type with a viewable face (50) for receiving light, wherein the surface-type in particular defines a planar or curved viewable face (50) of the chromatic reflective unit (1); and/or
   wherein the chromatic reflective unit (1) comprises a planar panel shape and planar non-coplanar surface sections (7'), and the non-coplanar surface sections (7') are non-parallel with respect to the planar panel shape.

7. The chromatic reflective unit (1) of any one of the preceding aspects, wherein the chromatic reflective unit (1) comprises a planar surface-type with a planar viewable face (50) and the reflective surface sections (3') of the plurality of reflective surface sections have a rectangular shape with a width in a width direction (w) that extends along the viewable face (50) and a height extending in a height direction (h) under an inclination angle with respect to the viewable face (50).

8. The chromatic reflective unit (1) of any one of the preceding aspects, wherein the reflective surface sections (3') of the plurality of reflective surface sections are oriented with respect to each other to form a step-like arrangement of reflective surface sections, in particular with steps of identical or varying shape.

9. The chromatic reflective unit (1) of any one of the preceding aspects, wherein the reflective surface sections (3') of at least a subgroup of the plurality of non-coplanar reflective surface sections form a sequence of reflective surface sections (3') being random-like in their orientation in space; and/or
   wherein the random-like orientation in particular includes a random-like inclination in one or two inclination directions; and/or
   wherein reflective surface sections (3') of the subgroup have shapes that are associated with section normals (55, na), wherein the shape is in particular planar or curved such as convex or concave, and the section normals (55, na) are inclined with respect to a unit normal (51) that is associated with a respective portion of a surface-type of the chromatic reflective unit (1) by inclination angles that, for a given inclination direction, are within an angular range up to about 30° about a subgroup orientation direction associated with the average of the inclination directions of the subgroup such as within an angular range of up to about 20°, 10°, or 5°; and/or
   wherein a subgroup orientation direction associated with the average of the inclination directions of a subgroup of the reflective surface sections (3') of the plurality of non-coplanar reflective surface sections (3') is inclined by a subgroup inclination angle in the range from about 2° to about 88°, in particular in the range from about 5° to about 60° such as in the range from about 10° to about 30°.

10. The chromatic reflective unit (1) of any one of the preceding aspects, wherein a shape associated with the plurality of non-coplanar reflective surface sections (3') is characterized by a variation in a distance (d) to a reference plane (19) that is measured along a straight measurement line (y) extending along the reference plane (19), wherein the reference plane (19) is coplanar with respect to a central plane (17) of the plurality of non-coplanar reflective surface sections (3'), the central plane (17) has a diffusing layer side (17A) and a reflector side (17B), the reference plane (19) is displaced from the central plane (17) at the diffusing layer side (17A) beyond any one of the plurality of non-coplanar reflective surface sections (3'), and the variation in the distance (d) comprises at least three local extrema (27), and in particular the distance (d) increases and decreases at least twice along the measurement line (y).

11. The chromatic reflective unit (1) of any one of the preceding aspects, wherein the chromatic reflective unit (1) is configured as a sandwich structure that comprise a sequence of sections providing the reflective surface sections (3'); and/or
   wherein the plurality of non-coplanar surface sections (7') is imprinted onto the support structure (7), and
   wherein in particular the support structure (7) comprises an illumination-sided stabilizing layer (121) with a 3D-surface structure or an imprinted shape that provide the basis of the form and orientation of the non-coplanar surface sections (7'), and thus the reflective surface sections (3').

12. The chromatic reflective unit (1) of any one of the preceding aspects, wherein, with respect to a single one of the plurality of reflective surface sections (3') and/or with respect to the plurality of reflective surface sections (3'), there is provided
   a constant or varying scattering characteristic of a respective chromatic diffusing layer section (41); and/or
   a constant or varying number of nanoparticle per unit surface area; and/or
   a constant or varying inclination angle.

13. The chromatic reflective unit (1) of any one of the preceding aspects, wherein the chromatic diffusing layer (5) is in contact with the reflective layer sections (3'); and/or
   wherein the chromatic diffusing layer (5) comprises a plurality of chromatic diffusing layer sections (41) being respectively associated with the plurality of reflective surface sections (3') and respectively forming a front side section of a front side (31A) of the chromatic diffusing layer (5), and
   wherein in particular a thickness of at least one chromatic diffusing layer section (41) of the plurality of chromatic diffusing layer sections (41) is constant.

14. The chromatic reflective unit (1) of any one of the preceding aspects, wherein a difference in the refractive index of the nanoparticles (37) with respect to the refractive index of the matrix (39), a size distribution of the nanoparticles (37), and a number of nanoparticles (37) per unit surface area are selected to provide for the specular reflectance that is larger in the red than in the blue and for the diffuse reflectance that is larger in the blue than in the red, and
   wherein in particular the differences in the specular reflectance and the diffuse reflectance are given as average values with respect to a blue portion and a red portion in the visible light spectrum, e.g. within a blue portion in the spectral range from 450 nm to 500 nm and a red portion in the spectral range from 620 nm to 670 nm.

15. The chromatic reflective unit (1) of any one of the preceding aspects, wherein the nanoparticles (37) contributing to the differences in the specular reflectance and the diffuse reflectance are referred to as Rayleigh-like acting scatterers, and the Rayleigh-like acting scatterers and the matrix (39) are essentially non-absorbing.

16. The chromatic reflective unit (1) of any one of the preceding aspects, wherein the relative refraction index $$m \equiv \frac{n_p}{n_h},$$

where $n_p$ is the refractive index of the nanoparticles (37) and $n_h$ is the refractive index of the matrix (39), is in the range $0.5 \leq m \leq 2.7$, and
   for m being in particular in the range $0.7 \leq m \leq 2.1$, an effective particle diameter $D = dn_h$, fulfills
   $D[nm] \leq 132\ m + 115$ if $0.7 \leq m < 1$;
   $D[nm] \leq 240$ if $1 < m < 1.35$; and
   $D[nm] \leq -135\ m + 507$ if $1.35 \leq m \leq 2.1$.

17. The chromatic reflective unit (1) of any one of the preceding aspects, wherein along a thickness propagation direction through the chromatic diffusing layer (5), the number of nanoparticles (37) per unit area is $$N \leq N_{max} = \frac{3.7 \times 10^{-28}}{D^6} \left| \frac{m^2 + 2}{m^2 - 1} \right|^2 \text{ [meters}^{-2}\text{]},$$

D being given in meters, and/or
   wherein the maximum filling fraction is $f \leq 0.4$ such as $f \leq 10^{-2}$.

17. The chromatic reflective unit (1) of any one of the preceding aspects, wherein the chromatic diffusing layer is a matrix based layer such as a coating, a paint, or a bulk material.

18. The chromatic reflective unit (1) of any one of the preceding aspects, wherein the chromatic diffusing layer (5) further comprises
  particles contributing to absorption of a limited spectral range such as in the infrared spectrum and/or in the ultraviolet spectrum and/or in a specific spectral range for superimposing a coloring to the appearance of the chromatic reflective unit (1); and/or
  particles having a size larger than the Rayleigh-like acting scatterers that contribute in particular to an increase forward scattering, thereby decreasing the specular reflectance, and wherein the specular reflectance is decreased in particular essentially independent of the color.

19. A chromatic reflective unit (1) comprising:
  a support structure (7) comprising a continuous coarse grain surface (410) comprising a plurality of mosaic-like surface structures providing a plurality of surface sections,
  a reflective layer (3) formed on the continuous coarse grain surface (410), thereby forming a plurality of non-coplanar reflective surface sections (3'), and
  a chromatic diffusing layer (5) having a back side provided at the reflective surface sections (3') and a front side for being illuminated by incident light (9), wherein the chromatic diffusing layer (5) comprises a plurality of nanoparticles (37) embedded in a matrix (39), and is configured to provide for a specular reflectance that is larger in the red than in the blue and for a diffuse reflectance that is larger in the blue than in the red.

20. A chromatic reflective unit (1) comprising:
  a support structure (7) configured as a chromatic diffusing layer (5) having a back side comprising a continuous coarse grain surface (410) comprising a plurality of mosaic-like surface structures providing a plurality of surface sections and a front side for being illuminated by incident light (9), wherein the chromatic diffusing layer (5) comprises a plurality of nanoparticles (37) embedded in a matrix (39), and is configured to provide for a specular reflectance that is larger in the red than in the blue and for a diffuse reflectance that is larger in the blue than in the red; and
  a reflective layer (3) formed on the a continuous coarse grain surface (410), thereby forming a plurality of non-coplanar reflective surface sections (3').

21. The chromatic reflective unit (1) of aspect 19 or aspect 20, wherein the plurality of surface sections are configured to redirect incident light beam portions such that
  a light beam after reflection at reflective layer on the continuous coarse grain surface is broadened in size,
  the illuminance values on the target illumination/observer area are reduced,
  redirected light beam portions exhibit local luminous peaks with a luminance comparable to the luminance of the emitting surface, and
  scattered light is perceived around redirected light beam portions and/or
  wherein the chromatic reflective unit of aspect 20 or aspect 21 further comprises features as recited in any one of aspects 1 to 18.

22. The chromatic reflective unit (1) of any one of aspect 19 to aspect 21, wherein a correlation area of the mosaic-like surface structures is selected to provide for a fragmentation of the vision of the light source emitting area when seen along an optical path including the continuous coarse grain surface from a target illumination/observer area, and
  wherein in particular the correlation area of the mosaic-like surface structures (i.e. the average transversal size of the single mosaic-like surface structure, essentially comparable in size to the size of the surface section, is defined by one complete surface oscillation) is in the range from about 0.5 mm to 1 m, and are in particular selected such that mosaic-like surface structures are resolvable by eye in a distance range associated with an observer of the illumination system (e.g. distance larger than 1 m or 100 m or more).

23. The chromatic reflective unit (1) of any one of aspect 19 to aspect 22, wherein
  the depth of the mosaic-like surface structures is comparable to the correlation area, and/or
  the mosaic-like surface structures are arranged partly regular, irregular, or random-like with respect to shape and orientation on the continuous coarse grain surface, and/or
  the mosaic-like surface structures comprise faceted structures based on geometric shapes, for example polyhedron-like shapes such as prism-like shapes, pyramid-like shapes, wedge-like shapes, and cube-like shapes, wherein the faceted structures extend from or reach into the continuous coarse grain surface, and the faceted structures comprise in particular rounded transitions of adjacent facets and/or curved facet surfaces.

24. The chromatic reflective unit (1) of any one of aspect 19 to aspect 23, wherein each surface section is geometrically configured, in particular in shape, size, and inclination, to optically redirect the light beam portion impinging on it (e.g. by reflection at a reflective layer applied to the surface section) to an average output direction that at least differs and/or is completely independent on the average direction of redirection of at least one adjacent surface section.

25. An illumination system comprising:
  a chromatic reflective unit (1) of any one of claim 1 to claim 24, and
  a light source (123) for illuminating the chromatic reflective unit (1).

Aspects B

1. A chromatic reflective unit (506) comprising:
  a reflective layer (508), and
  a chromatic diffusing layer (510) having a back side provided at the reflective layer (508) and a front side for being illuminated by incident light (504), wherein the
  chromatic diffusing layer (510) comprises a plurality of nanoparticles (37) embedded in a matrix (39), and is configured to provide for a specular reflectance that is larger in the red
  than in the blue and for a diffuse reflectance that is larger in the blue than in the red, wherein:
  said nanoparticles have an average size d in the range $10\ nm \le d \le 240\ nm$;
  the ratio between the blue and red scattering optical densities Log [R(450 nm)]/Log [R(630 nm)] of said chromatic reflective unit falls in the range $5 \ge \gamma \ge 2.5$, where $R(\lambda)$ is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range $10\ nm \le d \le 240\ nm$;
  for the direction normal to the reflective layer (508) of the chromatic reflective unit (506), the monochromatic normalized specular reflectance R(λ) of the chromatic reflective unit at a wavelength of 450 nm is in the range from about 0.0025 to about 0.15, such as defined by the equations 0.0025≤R(450 nm)≤0.15, 0.0025≤R(450 nm)≤0.05, 0.0025≤R(450 nm)≤0.04.

2. A chromatic reflective unit (506) comprising:
a reflective layer, and
a chromatic diffusing layer having a back side provided at the reflective layer and a front side for being illuminated by incident light (9), wherein the
chromatic diffusing layer comprises a plurality of nanoparticles (37) embedded in a matrix (39), and is configured to provide for a specular reflectance that is larger in the red than in the blue and for a diffuse reflectance that is larger in the blue than in the red, wherein:
said nanoparticles have an average size d in the range 10 nm≤d≤240 nm;
the ratio between the blue and red scattering optical densities Log [R(450 nm)]/Log [R(630 nm)] of said chromatic reflective unit falls in the range 5≥γ≥2.5, where R(λ) is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range 10 nm≤d≤240 nm;
for the direction normal to the reflective layer of the chromatic reflective unit the monochromatic normalized specular reflectance of the chromatic reflective unit at wavelength 450 nm is 0.05≤R(450 nm)≤0.15.

3. A chromatic reflective unit (506) comprising:
a reflective layer, and
a chromatic diffusing layer having a back side provided at the reflective layer and a front side for being illuminated by incident light (9), wherein the
chromatic diffusing layer comprises a plurality of nanoparticles (37) embedded in a matrix (39), and is configured to provide for a specular reflectance that is larger in the red than in the blue and for a diffuse reflectance that is larger in the blue than in the red, wherein:
said nanoparticles have an average size d in the range 10 nm≤d≤240 nm;
the ratio between the blue and red scattering optical densities Log [T(450 nm)]/Log [T(630 nm)] of said chromatic reflective unit falls in the range 5≥γ≥2.5, where R(λ) is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range 10 nm≤d≤240 nm;
for the direction normal to the reflective layer of the chromatic reflective unit the monochromatic normalized specular reflectance of the chromatic reflective unit at wavelength 450 nm is 0.0025≤R(450 nm)≤0.05.

4. A chromatic reflective unit (506) comprising:
a reflective layer, and
a chromatic diffusing layer having a back side provided at the reflective layer and a front side for being illuminated by incident light (9), wherein the
chromatic diffusing layer comprises a plurality of nanoparticles (37) embedded in a matrix (39), and is configured to provide for a specular reflectance that is larger in the red than in the blue and for a diffuse reflectance that is larger in the blue than in the red, wherein:
said nanoparticles have an average size d in the range 10 nm≤d≤240 nm;
the ratio between the blue and red scattering optical densities Log [R(450 nm)]/Log [R(630 nm)] of said chromatic reflective unit falls in the range 5≥γ≥2.5, where R(λ) is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range 10 nm≤d≤240 nm;
wherein along the direction normal to the reflective layer of solid optical diffuser the number of nanoparticles per unit area is $$N \geq N_{min} = \frac{3.82 \times 10^{-28}}{D^6}\left|\frac{m^2+2}{m^2-1}\right|^2 \text{ [meters}^{-2}\text{]}$$

and $$N \leq N_{max} = \frac{1.21 \times 10^{-27}}{D^6}\left|\frac{m^2+2}{m^2-1}\right|^2 \text{ [meters}^{-2}\text{]},$$

D being given in meters.

5. The chromatic reflective unit according to any of the previous aspects, further comprising a support structure for supporting the reflective layer or
the reflective layer being configured as a support structure, wherein
the reflective layer extends along the chromatic diffusing layer and or is attached to the chromatic diffusing layer and/or is attached to the support structure.

6. The chromatic reflective unit according to any of the previous aspects, wherein the relative refraction index $$m \equiv \frac{n_p}{n_h},$$

where $n_p$ is the refractive index of said nanoparticles (37) and $n_h$ is the refractive index of said transparent matrix (39), falls in the range 0.7≤m≤2.1, and the effective particle diameter, D=dn$_h$, fulfills D[nm]≤132 m+115 if 0.7≤m<1; D[nm]≤240 if 1<m<1.35 and D[nm]≤−135 m+507 if 1.35≤m≤2.1.

7. The chromatic reflective unit according to any of the previous aspects, wherein the maximum filling fraction is f≤0.4, such as f≤10$^{-2}$.

8. The chromatic reflective unit according to any of the previous aspects, wherein the chromatic diffusing layer has a thickness variation lower than 40%, for example 30%, such as 10% over lateral circular areas with diameter smaller than 20 cm, for example 10 cm, such as 3 cm.

9. The chromatic reflective unit according to any of the previous aspects, wherein the number of nanoparticles per unit area of the chromatic diffusing layer averaged over lateral circular areas with diameter 2 mm, does not vary more than 20%, for example 10%, such as 5%, among lateral circular areas within every region with diameter of 10 cm on at least 80% of the surface of the chromatic reflective unit.

10. The chromatic reflective unit (506) of any one of the preceding aspects,
wherein the reflective layer continuously extends the substrate structure, and is in particular directly applied on and structurally directly connected to the substrate structure; and/or wherein the reflective layer is a continuous metal layer on the substrate structure; and/or wherein the reflective layer has a thickness providing for a reflectivity of at least 65% or even at least 75% or even at least 85% such as 90% for light having passed through the chromatic diffusing layer; and/or wherein the chromatic diffusing layer has a thickness of 1 mm to 2 mm or a thickness that is less than the lateral extent such as less than 50% of the lateral extent, e.g. less than 0.5 mm such as in the range of about 0.1 mm; and/or wherein the reflective layer is formed by a surface portion of the support structure.

11. The chromatic reflective unit (506) of any one of the preceding aspects, wherein at least part of the reflective layer has a shape that is in particular planar or curved such as convex or concave.

12. The chromatic reflective unit (506) of any one of the preceding aspects, wherein the chromatic reflective unit (506) further comprises a mounting structure such as a frame structure for mounting the chromatic reflective unit, in particular the support structure, the reflective layer, and/or the chromatic diffusing layer.

13. The chromatic reflective unit (506) of any of the preceding aspects, wherein the support structure comprises a supporting structure made of glass, a sandwich structure, PMMA, a metal such as aluminum having applied thereon and/or integrated therein the reflective layer and/or the chromatic diffusing layer, and wherein in particular the sandwich structure is an aluminum or steel composite panel having a mount-sided stabilizing layer, an illumination-sided stabilizing layer, and a core layer there-between, wherein the reflective layer is provided on or integrated into the illumination-sided stabilizing layer and the chromatic diffusing layer is applied onto the reflective layer or onto the illumination-sided stabilizing layer.

14. The chromatic reflective unit (506) of any one of the preceding aspects, wherein a difference in the refractive index of the nanoparticles (37) with respect to the refractive index of the matrix (39), a size distribution of the nanoparticles (37), and a number of nanoparticles (37) per unit surface area are selected to provide for the specular reflectance that is larger in the red than in the blue and for the diffuse reflectance that is larger in the blue than in the red, and wherein in particular the differences in the specular reflectance and the diffuse reflectance are given as average values with respect to a blue portion and a red portion in the visible light spectrum, e.g. within a blue portion in the spectral range from 450 nm to 500 nm and a red portion in the spectral range from 620 nm to 670 nm.

15. The chromatic reflective unit (506) of any one of the preceding aspects, wherein the nanoparticles (37) contributing to the differences in the specular reflectance and the diffuse reflectance are referred to as Rayleigh-like acting scatterers, and the Rayleigh-like acting scatterers and the matrix (39) are essentially non-absorbing.

16. The chromatic reflective unit (506) of any one of the preceding aspects, wherein the chromatic diffusing layer is a matrix based layer such as a coating, a paint, or a bulk material.

17. The chromatic reflective unit (506) of any one of the preceding aspects, wherein the chromatic diffusing layer further comprises particles contributing to absorption of a limited spectral range such as in the infrared spectrum and/or in the ultraviolet spectrum and/or in a specific spectral range for superimposing a coloring to the appearance of the chromatic reflective unit (506); and/or particles having a size larger than the Rayleigh-like acting scatterers that contribute in particular to an increase forward scattering, thereby decreasing the specular reflectance, and wherein the specular reflectance is decreased in particular essentially independent of the color.

18. The chromatic reflective unit according to any of the previous aspects, wherein the chromatic diffusing layer further comprises low angle diffusing particles within the matrix and/or a (micro-) surface structure contributing to forming a low-angle scattering cone around the specular reflection and having a size larger than the nanoparticles particles acting as the Rayleigh-like scatterers, and wherein the low angle diffusing particles scatter light within an angular fan with a full width half maximum (FWHM) divergence that is narrower than the FWHM divergence generated by the Rayleigh-like diffuser, for example three times smaller, such as four times smaller.

19. A lighting system comprising:

a light source (2) configured to generate a visible light beam;

a chromatic stratified panel structure as recited in any one of the preceding aspects, illuminated by the light source (2), wherein a portion of the light beam forms an illuminating light beam by passing through the chromatic stratified panel structure essentially unscattered, and a portion if the light of the light beam is Rayleigh-like scattered by the nanoparticles within the chromatic stratified panel structure.

20. The lighting system of aspect 19, wherein a first color of the Rayleigh-like scattered light and a second color of the essentially not Rayleigh-like scattered direct light are separated in u'v'-color space by at least 0.008 such as at least 0.02 or 0.03; and/or a direct light correlated color temperature is close to the black body color temperature, for example in the range from 800 K to 6 500 K; and/or a first color is associated with a diffuse light correlated color temperature that is different from, in particular larger than, the direct light correlated color temperature of the light beam; and/or a direct light correlated color temperature differs from a diffuse light correlated color temperature by a factor of 0.85 or less.

It is finally noted that the lighting system as disclosed herein may comprise a chromatic reflective unit that comprises a structural feature and/or a Rayleigh-like scattering feature as disclosed with respect to any one of the aspects and embodiments of the foregoing description, despite the difference in overall shape.

Although the preferred embodiments of this invention have been described herein, improvements and modifications may be incorporated without departing from the scope of the following claims.

The invention claimed is:
1. A lighting system comprising:
a light source; and
a chromatic reflective unit wherein the chromatic reflective unit
comprises a reflective layer, and a chromatic diffusing layer having a back side provided at the reflective layer and a front side for being illuminated by incident light from the light source, wherein the chromatic diffusing layer comprises a plurality of nanoparticles embedded in a matrix, and
the chromatic reflective unit is configured to provide for a specular reflectance that is larger in the red than in the blue, and for a diffuse reflectance that is larger in the blue than in the red, wherein said nanoparticles have an average size d in the range 10 nm≤d≤240 nm, the ratio between the blue and red scattering optical densities Log [R(450 nm)]/Log [R(630 nm)] of the chromatic reflective unit falls in the range 5≥γ≥2.5, where R(λ) is the monochromatic normalized specular reflectance of the chromatic reflective unit, which is the ratio between the specular reflectance of the chromatic reflective unit and the specular reflectance of a reference sample identical to the chromatic reflective unit except for the fact that the chromatic diffusing layer does not contain nanoparticles with the size d in the range 10 nm≤d≤240 nm, and along the direction normal to the reflective layer, the number N of nanoparticles per unit area is given by $$N \geq N_{min} = \frac{2.07 \times 10^{-29}}{D^6} \left| \frac{m^2+2}{m^2-1} \right|^2 \text{ [meters}^{-2}\text{]}$$

and $$N \leq N_{max} = \frac{1.21 \times 10^{-27}}{D^6} \left| \frac{m^2+2}{m^2-1} \right|^2 \text{ [meters}^{-2}\text{]},$$

D being the effective particle diameter given in meters, and wherein the chromatic reflective unit is shaped as a rotational paraboloid or a portion of a rotational paraboloid, and the light source is positioned close to or at the paraboloid focal position.

2. The lighting system of claim 1, wherein any of the following factors may be applied as upper or lower limit, including that value or excluding that value respectively in the term $$\frac{\text{factor}}{D^6} \left| \frac{m^2+2}{m^2-1} \right|^2$$

to obtain N as expressed in [meters$^{-2}$], with D given in [meters]:

| factor (e.g. for Nmin) | factor (e.g. for Nmax) |
|---|---|
| 4.24e−29 | 9.27e−28 (1.04e−27) |
| 8.99e−29 | 6.48e−28 (7.27e−28) |
| 2.79e−28 | 3.69e−28 |
| 3.69e−28 (4.14e−28) | 2.79e−28 |
| 4.85e−28 (5.44e−28) | 2.06e−28 |
| 9.27e−28 (1.04e−27) | 1.21e−27 |
| 9.48e−28 (1.06e−27) | 1.17e−27 (1.31e−27) |
| 9.72e−28 (1.09e−27) | 1.07e−27 (1.20e−27). |

3. The lighting system of claim 1, wherein the relative refraction index $$m \equiv \frac{n_p}{n_h},$$

where $n_p$ is the refractive index of said nanoparticles and $n_h$ is the refractive index of said transparent matrix, falls in the range 0.7≤m≤2.1, and the effective particle diameter, $D \equiv dn_h$, fulfills D[nm]≤132 m+115 if 0.7≤m<1; D[nm]≤240 if 1<m<1.35 and D[nm]≤−132 m+507 if 1.35≤m≤2.1.

4. The lighting system of claim 1, wherein the chromatic reflective unit is configured such that, for the direction normal to the reflective layer of the chromatic reflective unit, the monochromatic normalized specular reflectance of the chromatic reflective unit at wavelength 450 nm is 0.0025≤R (450 nm)≤0.15.

5. The lighting system of claim 1, wherein the chromatic reflective unit comprises
 a white-light low-angle diffuser configured to introduce an overall beam divergence smaller than 30° or smaller than 10°, and/or
 a white-light low-angle diffuser shaped as surface structures.

6. The lighting system of claim 1, wherein the chromatic reflective unit comprises a hanging tool configured to append or hang the chromatic reflective unit.

7. The lighting system of claim 6, wherein the axis of the paraboloid is inclined with respect to the vertical position by at least 10°.

8. The lighting system of claim 1, wherein the light source emits light inside a cone with full width angular divergence larger than 60°, and/or
 wherein the light source is configured as a two-dimension array of LEDs and a circular reflective compound parabolic concentrator with the LED array at the input face of the compound parabolic concentrator.

9. The lighting system of claim 1, further comprising
 an infrared (IR) light emitter different from the light source, wherein
 the IR light emitter substantially emits electromagnetic radiation in a wavelength range from 0.7 μm to 100 μm or from 0.8 μm to 12 μm, and/or
 is essentially free from visible wavelength components.

10. The lighting system of claim 1, further comprising
 a support structure for supporting the reflective layer.

11. The lighting system of claim 10, wherein the reflective layer continuously extends on the support structure, and is directly applied on and structurally directly connected to the support structure;
 or
 wherein the reflective layer is formed by a surface portion of the support structure.

12. The lighting system of claim 10, wherein the reflective layer is a continuous metal layer on the support structure having a thickness providing for a reflectivity of
 at least 65% or at least 85% for light having passed through the chromatic diffusing layer; and/or
 wherein the chromatic diffusing layer has a thickness of 1 mm to 2 mm or
 a thickness that is less than the lateral extent.

13. The lighting system of claim 1, wherein the number of nanoparticles per unit area of the chromatic diffusing layer averaged over lateral circular areas with diameter 2 mm, does not vary more than 20% among lateral circular areas within every region with diameter of 10 cm on at least 80% of the surface of the chromatic reflective unit.

14. The lighting system of claim 1, wherein the nanoparticles and the matrix are essentially non-absorbing, and/or
 wherein the chromatic diffusing layer is a matrix based layer.

15. The lighting system of claim 1, wherein the nanoparticles having the average size d in the range 10 nm≤d≤240 nm are a first dispersion of the light-scattering centers and wherein the chromatic reflective unit comprises a second dispersion of light-scattering centers with an average size which is exactly or more than 5 times larger or exactly or more than 15 times larger than the average size of the light scattering centers forming the first dispersion.

16. The lighting system of claim 1, wherein the light source emits light inside a cone with full width angular divergence larger or around 120°.

17. The lighting system of claim 1, further comprising an infrared (IR) light emitter
positioned in the surrounding of the light source or that surrounds the exit side of the light source.

18. The lighting system of claim 1,
wherein the reflective layer is configured as a support structure, wherein
the reflective layer extends along the chromatic diffusing layer and or is attached to the chromatic diffusing layer and/or is attached to the support structure.

19. The lighting system of claim 1, wherein the number of nanoparticles per unit area of the chromatic diffusing layer averaged over lateral circular areas with diameter 2 mm, does not vary more than 10%, among lateral circular areas within every region with diameter of 10 cm on at least 80% of the surface of the chromatic reflective unit.

20. The lighting system of claim 1,
wherein the chromatic diffusing layer is a coating, a paint, or a bulk material.

21. The lighting system of claim 1, wherein the reflective layer has a reflectivity of at least 65% or at least 85% for light having passed through the chromatic diffusing layer.

22. The lighting system of claim 1, wherein the chromatic diffusing layer scatters short-wavelength components of impinging light with respect to long-wavelength components of the impinging light such that scattering occurs in the Rayleigh or extended Rayleigh regime.

23. The lighting system of claim 1, wherein the red indicates a wavelength of an incident broad spectrum that is longer than in the blue.

24. The lighting system of claim 23, wherein the wavelength of the blue is in the spectral range from 450 nm to 500 nm and the wavelength of the red is in the spectral range from 620 nm to 670 nm.

* * * * *